US010903908B2

(12) United States Patent
Sano et al.

(10) Patent No.: US 10,903,908 B2
(45) Date of Patent: Jan. 26, 2021

(54) OPTICAL TRANSMISSION APPARATUS, OPTICAL TRANSMISSION METHOD, CONTROL CIRCUIT OF THE OPTICAL TRANSMISSION APPARATUS, AND STORAGE MEDIUM OF THE OPTICAL TRANSMISSION APPARATUS

(71) Applicant: Mitsubishi Electric Corporation, Tokyo (JP)

(72) Inventors: Hayato Sano, Tokyo (JP); Kiyotomo Hasegawa, Tokyo (JP); Mizuki Shirao, Tokyo (JP); Yuto Ueno, Tokyo (JP); Yoshiya Sato, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/611,273

(22) PCT Filed: Jun. 21, 2017

(86) PCT No.: PCT/JP2017/022909
§ 371 (c)(1),
(2) Date: Nov. 6, 2019

(87) PCT Pub. No.: WO2018/235207
PCT Pub. Date: Dec. 27, 2018

(65) Prior Publication Data
US 2020/0106527 A1 Apr. 2, 2020

(51) Int. Cl.
H04B 10/50 (2013.01)
H04B 10/516 (2013.01)
(Continued)

(52) U.S. Cl.
CPC ......... *H04B 10/5161* (2013.01); *G02F 1/025* (2013.01); *H04B 10/564* (2013.01);
(Continued)

(58) Field of Classification Search
CPC .............. H04B 10/5161; H04B 10/564; H04B 10/50575; H04B 10/50595; H04B 10/541;
(Continued)

(56) References Cited
U.S. PATENT DOCUMENTS 5,126,870 A * 6/1992 Murphy ................ G02F 1/0327
398/186
5,386,109 A * 1/1995 Ikeuchi ................... H03F 3/082
250/214 A
(Continued)

FOREIGN PATENT DOCUMENTS

JP 2000-292756 A 10/2000
JP 2003-169024 A 6/2003
JP 2011-2474 A 1/2011

OTHER PUBLICATIONS

Kishi et al., "56-Gb/s Optical Transmission Performance of an InP HBT PAM4 Driver Compensating for Nonlinearity of Extinction Curve of EAM", Journal of Lightwave Technology, Jan. 1, 2017, vol. 35. No. 1, p. 75-81.
(Continued)

Primary Examiner — Dibson J Sanchez
(74) Attorney, Agent, or Firm — Birch, Stewart, Kolasch & Birch, LLP

(57) ABSTRACT

An optical transmission apparatus (100) includes an optical transmitter (200) including an optical modulator (220) and an observation optical modulator (230) that attenuate optical power of input continuous wave light by an electro-absorption effect and output the continuous wave light. The optical modulator (220) performs pulse amplitude modulation on the continuous wave light and outputs the optical signal. The apparatus also includes: a bias voltage generation unit (350) that generates a direct-current bias voltage and outputs the direct-current bias voltage to the optical modulator (220) and the observation optical modulator (230); a modulation
(Continued)

signal generation unit (360) that generates an electrical signal for pulse amplitude modulation and outputs the electrical signal to the optical modulator (220); and a bias voltage control unit (340) that instructs the bias voltage generation unit (350) to adjust the direct-current bias voltage on the basis of an absorption amount of optical power in the optical modulator (220) and an absorption amount of optical power in the observation optical modulator (230).

12 Claims, 12 Drawing Sheets

(51) Int. Cl.
    *G02F 1/025*     (2006.01)
    *H04B 10/564*     (2013.01)
    *G02F 1/015*     (2006.01)

(52) U.S. Cl.
    CPC ...... *G02F 2001/0157* (2013.01); *H04B 10/50* (2013.01); *H04B 10/5051* (2013.01); *H04B 10/5053* (2013.01)

(58) Field of Classification Search
    CPC .. H04B 10/524; H04B 10/50; H04B 10/5053; H04B 10/5051; G02F 1/025; G02F 2001/0157; G02F 1/015
    USPC .................................................. 398/182–201
    See application file for complete search history.

(56) References Cited

U.S. PATENT DOCUMENTS

| | | | | |
|---|---|---|---|---|
| 5,394,260 | A * | 2/1995 | Suzuki | G02F 1/0121 |
| | | | | 372/12 |
| 5,434,693 | A * | 7/1995 | Tanaka | G02F 1/0121 |
| | | | | 372/26 |
| 6,014,392 | A * | 1/2000 | Imai | G02F 1/0121 |
| | | | | 372/26 |
| 6,483,624 | B1 * | 11/2002 | Otani | G02F 1/0121 |
| | | | | 398/154 |
| 6,873,801 | B1 * | 3/2005 | Yamaki | H04B 10/505 |
| | | | | 398/197 |
| 9,838,135 | B1 * | 12/2017 | Xu | H04B 10/516 |
| 10,036,904 | B1 * | 7/2018 | Nagarajan | G02F 1/0123 |
| 2005/0225826 | A1 * | 10/2005 | Krawczak | H04B 10/505 |
| | | | | 359/239 |
| 2008/0107428 | A1 * | 5/2008 | Abe | H04B 10/572 |
| | | | | 398/187 |
| 2009/0016712 | A1 * | 1/2009 | Kagawa | H04B 10/07953 |
| | | | | 398/9 |
| 2015/0244466 | A1 * | 8/2015 | Okamoto | H04B 10/54 |
| | | | | 398/140 |
| 2017/0346570 | A1 * | 11/2017 | Teranishi | H04B 10/5161 |
| 2017/0351123 | A1 * | 12/2017 | Shintaku | G02F 1/0123 |

OTHER PUBLICATIONS

Szczerba et al., "4-PAM for High-Speed Short-Range Optical Communications", Journal of Optical Communications and Networking, vol. 4, No. 11, Nov. 2012, p. 885-894.

* cited by examiner

OPTICAL TRANSMISSION APPARATUS, OPTICAL TRANSMISSION METHOD, CONTROL CIRCUIT OF THE OPTICAL TRANSMISSION APPARATUS, AND STORAGE MEDIUM OF THE OPTICAL TRANSMISSION APPARATUS

FIELD

The present invention relates to an optical transmission apparatus and an optical transmission method for transmitting information using pulse amplitude modulation (PAM).

BACKGROUND

Internet traffic has been increasing with the spread of the Internet in the 1990s. Communication capacity has been increasing after 2010 as well due to the spread of smartphones, the development of Internet of Things (IoT), and the like. This trend is expected to continue in the future, and optical communication networks within supercomputers, within data centers or between data centers will become increasingly important. In an optical communication network, there coexist various forms such as optical fiber communication at a relatively short distance of several hundred meters to several kilometers and optical fiber communication at a middle distance longer then the above distance. In order to provide such an optical communication network accommodating various transmission distances and applications, standardization of specifications is being carried out by standardizing bodies and the like.

Currently, a discussion is being held on 400 Gbps Ethernet (400 GbE), which is a standard for the next generation Ethernet (registered trademark), in The Institute of Electrical and Electronics Engineers (IEEE) P802.3bs. While a Non Return to Zero (NRZ) modulation scheme has been often employed in conventional standards, a PAM-4 modulation scheme is expected to be employed in 400 GbE. For example, as described in Non Patent Literature 1, by using the PAM-4 modulation scheme which is four-level amplitude modulation instead of the conventional NRZ modulation scheme which is two-level amplitude modulation, double transmission capacity can be achieved for the same modulation speed.

In the PAM-4 modulation scheme, an amplitude set to a value at any of four levels in correspondence to a value to be transmitted is required to ensure that an interval between amplitudes is as large as possible and the amplitudes vary within the same variation range. For example, where the four levels of optical power indicating amplitude are denoted by level 3, level 2, level 1, and level 0 in descending order from the highest level of the optical power, it is required that the interval between level 3 and level 2, the interval between level 2 and level 1, and the interval between level 1 and level 0 each become as large as possible, and the respective intervals be equal. When these intervals decrease, an error rate in data transmission increases. When the difference between the intervals increases, an error rate at a time of transmitting data of a specific value increases.

Electro-absorption modulated laser diode (EML) is one of optical transmitters to which the PAM-4 modulation scheme is applied. The EML is an optical transmitter made up of a semiconductor laser serving as a light source and an external modulator that is an electro-absorption (EA) modulator of a waveguide structure. In the EML, the light source outputs continuous wave (CW) light. The EA modulator, which is an optical modulator using an electro-absorption effect, allows continuous wave light output from the light source to pass through a waveguide out of the EA modulator. The EA modulator changes the transmittance of the optical power of the waveguide by applying an electrical signal for modulation to the waveguide when the continuous wave light passes through the waveguide, such that the optical power of the light to be output from the EA modulator becomes lower than that of the light at a time of the input into the EA modulator. Because the transmittance of the optical power of the waveguide changes in correspondence to a value of an applied voltage, a voltage applied to the waveguide needs to be changed in order for the EA modulator to modulate the continuous wave light. A typical EA modulator is configured to apply an electrical signal for modulation and a direct-current (DC) bias voltage to a waveguide. Changing a voltage of the electrical signal for modulation changes a voltage applied to the waveguide, thereby changing the transmittance of the optical power of the waveguide. The EA modulator has a characteristic referred to as an extinction curve. The extinction curve represents a relationship between the voltage applied to the waveguide and an extinction ratio of output light or the transmittance of the optical power of the waveguide. The DC bias voltage is determined in consideration of the extinction curve and a voltage that can be provided by the electrical signal for modulation. Specifically, the DC bias voltage is set so that the intervals between the above levels is as large as possible and the respective intervals are equal. To bring the intervals between the levels close to those which are equal to one another, a variation range of the voltage applied to the waveguide of the EA modulator, specifically, a variation range of a value of the sum of the voltage of the electrical signal for modulation and the DC bias voltage should fall within a region where the extinction curve has a quasi-linear characteristic. Therefore, the DC bias voltage to be applied to the EA modulator is ideally set to a value at which a variation range of a voltage actually applied to the waveguide falls within a region where the extinction curve has a quasi-linear characteristic.

CITATION LIST

Non Patent Literature

Non Patent Literature 1: K. Szczerba, A. Larsson et al., "4-PAM for High-Speed Short-Range Optical Communications", Journal of Optical Communications and Networking, Vol. 4, No. 11, November 2012.

SUMMARY

Technical Problem

However, when the optical transmitter using the EA modulator is used in an actual optical communication network, the extinction curve of the EA modulator may change due to, for example, changes in driving conditions, changes in environmental conditions, and aging deterioration, of the optical transmitter. When the extinction curve changes, a condition for an optimum DC bias voltage shifts, and the four levels of optical power of light output from the optical transmitter also change. As a result, a difference between intervals between adjacent ones of the four levels of optical power increases, and an error rate increases.

The present invention has been made in view of the above, and it is an object of the present invention to provide an optical transmission apparatus capable of preventing deterioration of transmission quality.

Solution to Problem

In order to solve the above problems and achieve the object, an optical transmission apparatus according to the present invention comprises an optical transmitter including a first optical modulator to attenuate optical power of input continuous wave light by an electro-absorption effect and to output the optical signal, and a second optical modulator to attenuate optical power of input continuous wave light by the electro-absorption effect and to output the continuous wave light. The first optical modulator performs pulse amplitude modulation on the continuous wave light and outputs the optical signal subjected to the pulse amplitude modulation. The optical transmission apparatus further comprises: a bias voltage generation unit to generate a direct-current bias voltage and to output the direct-current bias voltage to the first optical modulator and the second optical modulator; a first modulation signal generation unit to generate an electrical signal for the pulse amplitude modulation and to output the electrical signal to the first optical modulator; and a bias voltage control unit to instruct the bias voltage generation unit to adjust the direct-current bias voltage, on a basis of an absorption amount of the optical power in the first optical modulator and an absorption amount of the optical power in the second optical modulator.

Advantageous Effects of Invention

The optical transmission apparatus according to the present invention achieves an effect of preventing the deterioration of transmission quality.

DESCRIPTION OF EMBODIMENTS

Hereinafter, an optical transmission apparatus and an optical transmission method according to each embodiment of the present invention will be described in detail with reference to the drawings. The present invention is not limited to the embodiments.

First Embodiment

Figure 1:
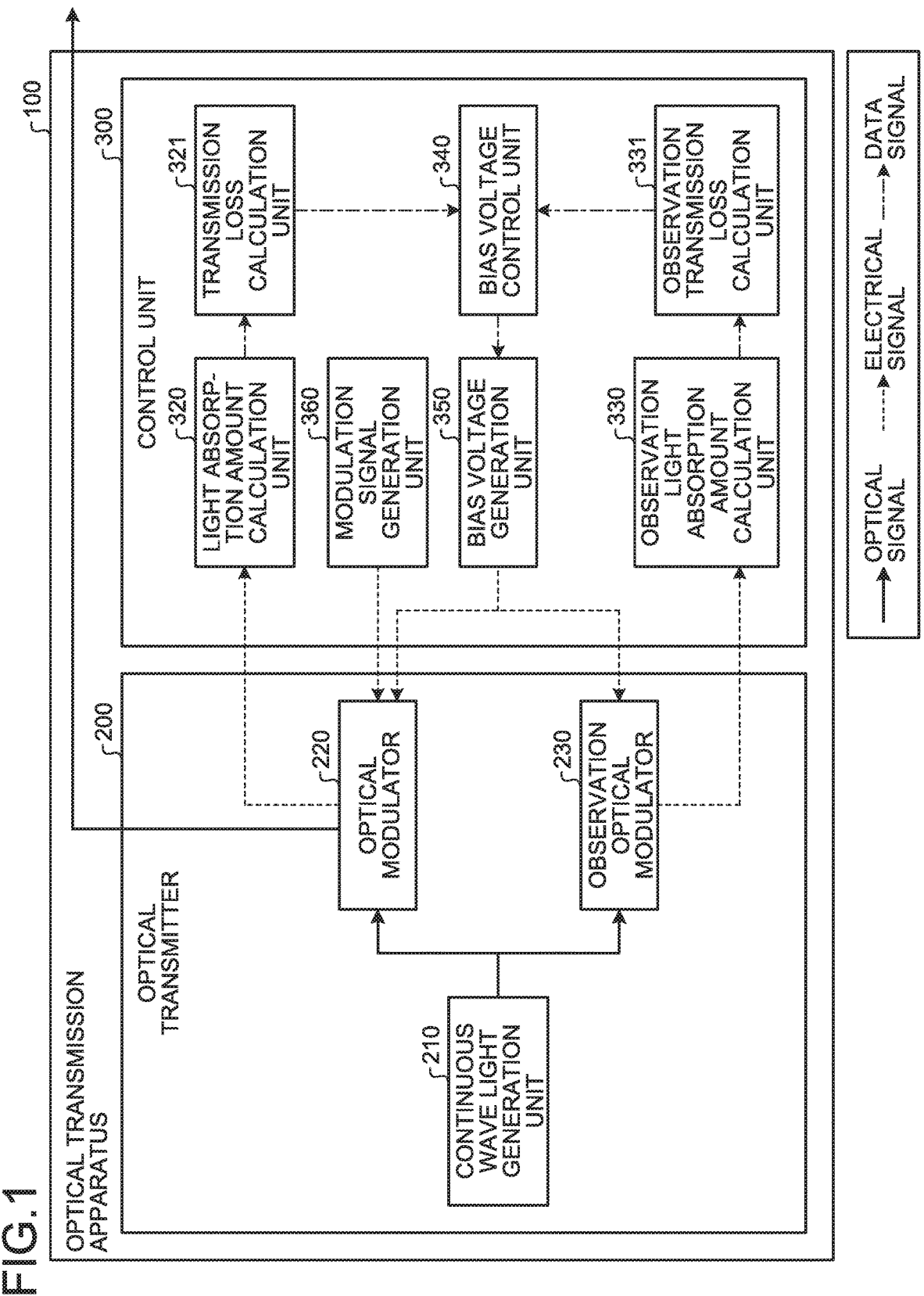
FIG. 1 is a diagram illustrating an example configuration of an optical transmission apparatus according to a first embodiment.

FIG. 1 is a diagram illustrating an example configuration of an optical transmission apparatus according to a first embodiment of the present invention. The optical transmission apparatus 100 according to the present embodiment illustrated in FIG. 1 constitutes an optical communication system, and transmits and receives optical signals to and from an optical reception apparatus via an optical fiber, a wireless space, or the like.

An actual optical system is typically configured so that an optical communication apparatus including an optical transmission apparatus and an optical reception apparatus transmits and receives optical signals to and from another optical communication apparatus that is a communication partner. In that case, the optical transmission apparatus 100 illustrated in FIG. 1 and an optical reception apparatus (not illustrated) make up an optical communication apparatus, and the optical transmission apparatus 100 transmits an optical signal to an optical communication apparatus that is a similarly configured communication partner.

The optical transmission apparatus 100 includes an optical transmitter 200 and a control unit 300. The optical transmitter 200 modulates continuous wave light, using a data signal input as an electrical signal from the control unit 300, such that the optical transmitter 200 generates a transmission signal obtained by converting the data signal into an optical signal. The data signal is a signal that should be sent to the optical communication apparatus that is a communication partner. The control unit 300 generates the data signal and a DC bias voltage that is to be applied to the optical transmitter 200. The data signal generated by the control unit 300 is input to the optical transmitter 200 and used as an electrical signal for modulation. The control unit 300 may be implemented on a control board dedicated to the optical transmitter 200 or may be implemented on a control board for the entire optical transmission apparatus 100.

The optical transmitter 200 includes a continuous wave light generation unit 210, an optical modulator 220, and an observation optical modulator 230.

The continuous wave light generation unit 210 generates continuous wave light which is a source of an optical signal that is to be transmitted to the optical communication apparatus that is a communication partner. The continuous wave light generation unit 210 outputs the generated continuous wave light to the optical modulator 220 and the observation optical modulator 230.

The optical modulator 220, which is a first optical modulator, is an EA modulator capable of performing an optical modulation process using an electro-absorption effect on input continuous wave light. On the basis of the electrical signal for modulation and the DC bias voltage input from the control unit 300, the optical modulator 220 generates an optical signal that is to be transmitted to the optical communication apparatus that is a communication partner. Specifically, using the electrical signal for modulation and the DC bias voltage, the optical modulator 220 performs PAM-4 modulation on the continuous wave light input from the continuous wave light generation unit 210. By performing this PAM-4 modulation, the optical modulator 220 generates an optical signal. The PAM-4 modulation is four-level pulse amplitude modulation. The optical modulator 220 is an optical modulator used in a general EML or the like. Although not illustrated, the optical modulator 220 includes a waveguide in which an optical transmittance changes as an applied voltage changes. The optical modulator 220 modulates the continuous wave light passing through the waveguide as the optical power of the continuous wave light is changed by a change in the voltage applied to the waveguide. The optical modulator 220 outputs the modulated light as an optical signal. When the voltage applied to the waveguide increases, the optical transmittance decreases, such that the optical power of the optical signal output from the optical modulator 220 also decreases.

The observation optical modulator 230, which is a second optical modulator, is an EA modulator capable of performing an optical modulation process using the electro-absorption effect on the input continuous wave light, similarly to the optical modulator 220. However, the observation optical modulator 230 is configured so that only the DC bias voltage is applied thereto. Therefore, the observation optical modulator 230 changes the optical power of the continuous wave light input from the continuous wave light generation unit 210, to optical power corresponding to a value of the DC bias voltage applied from the control unit 300, and outputs the continuous wave light. Similarly to the optical modulator 220, the observation optical modulator 230 includes a waveguide in which an optical transmittance changes as an applied voltage changes. The observation optical modulator 230 changes the optical power of the continuous wave light passing through the waveguide with the DC bias voltage applied to the waveguide. The extinction curve representing optical transmission characteristics of the waveguide of the observation optical modulator 230 is similar to the extinction curve of the waveguide of the optical modulator 220.

The control unit 300 includes a light absorption amount calculation unit 320, a transmission loss calculation unit 321, an observation light absorption amount calculation unit 330, an observation transmission loss calculation unit 331, a bias voltage control unit 340, a bias voltage generation unit 350, and a modulation signal generation unit 360.

The light absorption amount calculation unit 320, which is a first light absorption amount calculation unit, calculates a light absorption amount resulting from optical modulation performed by the optical modulator 220 of the optical transmitter 200. That is, the light absorption amount calculation unit 320 calculates a ratio between the optical power of the input light to the optical modulator 220 and the optical power of the output light from the optical modulator 220. The light absorption amount calculation unit 320 calculates the light absorption amount on the basis of: an electrical signal indicating the optical power of the input light; and an electrical signal indicating the optical power of the output light, which electrical signals are output from the optical modulator 220. The light absorption amount calculation unit 320 may calculate the light absorption amount over a plurality of times and output an average value thereof. The light absorption amount calculated by the light absorption amount calculation unit 320 is a first light absorption amount.

The transmission loss calculation unit 321, which is a first transmission loss calculation unit, calculates a transmission loss of light per unit length of the waveguide of the optical modulator 220 on the basis of the light absorption amount calculated by the light absorption amount calculation unit 320. The unit of transmission loss is, for example, "1/cm" or "dB/cm". It is noted that the transmission loss calculation unit 321 retains in advance information on the length of the waveguide of the optical modulator 220. The waveguide of the optical modulator 220 corresponds to a modulation waveguide described later.

The observation light absorption amount calculation unit 330, which is a second light absorption amount calculation unit, calculates a light absorption amount resulting from a process in which the observation optical modulator 230 of the optical transmitter 200 changes the optical power of the continuous wave light. That is, the observation light absorption amount calculation unit 330 calculates a ratio between the optical power of the input light to the observation optical modulator 230 and the optical power of the output light from the observation optical modulator 230. The observation light absorption amount calculation unit 330 calculates a light absorption amount on the basis of: an electrical signal indicating the optical power of the input light; and an electrical signal indicating the optical power of the output light, which electrical signals are output from the observation optical modulator 230. The observation light absorption amount calculation unit 330 may calculate the light absorption amount over a plurality of times and output an average value thereof. The light absorption amount calculated by the observation light absorption amount calculation unit 330 is a second light absorption amount.

The observation transmission loss calculation unit 331, which is a second transmission loss calculation unit, calculates a transmission loss of light per unit length of the waveguide of the observation optical modulator 230 on the basis of the light absorption amount calculated by the observation light absorption amount calculation unit 330. It is noted that the observation transmission loss calculation unit 331 retains in advance information on the length of the waveguide of the observation optical modulator 230. The waveguide of the observation optical modulator 230 corresponds to an observation waveguide described later.

The bias voltage control unit 340 controls a DC bias voltage generated by the bias voltage generation unit 350 on the basis of a first transmission loss and a second transmission loss. The first transmission loss is the transmission loss of light per unit length calculated by the transmission loss calculation unit 321. The second transmission loss is the transmission loss of light per unit length calculated by the observation transmission loss calculation unit 331. The bias voltage control unit 340 controls the DC bias voltage generated by the bias voltage generation unit 350 by instructing the bias voltage generation unit 350 to adjust the DC bias voltage on the basis of the first transmission loss and the second transmission loss.

The bias voltage generation unit 350 generates a DC bias voltage that is to be applied to the optical modulator 220 and the observation optical modulator 230 of the optical transmitter 200. In accordance with the instruction from the bias voltage control unit 340, the bias voltage generation unit 350 changes the DC bias voltage that is to be generated.

The modulation signal generation unit 360, which is a first modulation signal generation unit, generates an electrical signal for modulation, on the basis of a data signal desired to be transmitted to the optical communication apparatus that is a communication partner. The modulation signal generation unit 360 outputs the generated electrical signal for modulation, to the optical modulator 220 of the optical transmitter 200. The electrical signal for modulation generated by the modulation signal generation unit 360 is an electrical signal for pulse amplitude modulation and has four levels of voltage. The four levels of voltage, which is output from the modulation signal generation unit 360 as an electrical signal for modulation, are levels which are vertically symmetrical with respect to an average of the levels.

Next, an operation by the control unit 300 of the optical transmission apparatus 100 for adaptively adjusting the DC bias voltage applied to the optical transmitter 200 will be described with reference to FIGS. 2 to 5.

Figure 2:
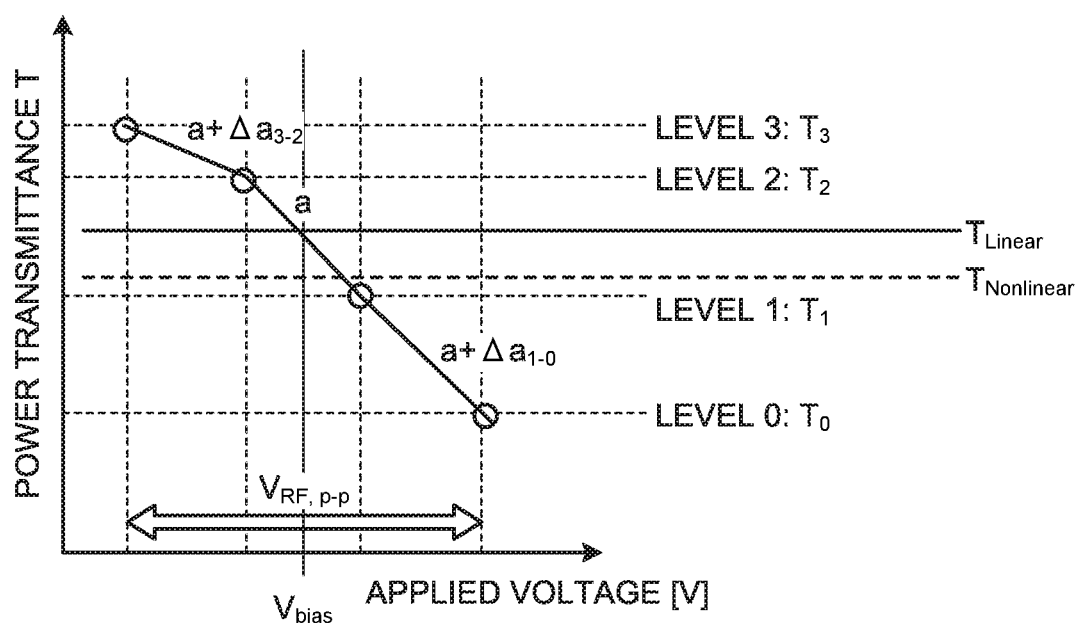
FIG. 2 is a diagram for explaining the principle of an operation by a control unit of an optical transmission apparatus according to the first embodiment for adjusting a DC bias voltage applied to an optical transmitter.

FIG. 2 is a diagram for explaining the principle of the operation by the control unit 300 of the optical transmission apparatus 100 according to the first embodiment for adjusting the DC bias voltage applied to the optical transmitter 200.

FIG. 2 illustrates a relationship between the voltage applied to the optical modulator 220 of the optical transmitter 200 and the power transmittance of the waveguide of the optical modulator 220. The horizontal axis represents the voltage applied to the optical modulator 220, and the vertical axis represents the power transmittance of the waveguide. The optical modulator 220 outputs light having optical power of level 0 when a voltage is applied which provides a power transmittance of $T_0$. The optical modulator 220 outputs light having optical power of level 1 when a voltage is applied which provides a power transmittance of $T_1$. The optical modulator 220 outputs light having optical power of level 2 when a voltage is applied which provides a power transmittance of $T_2$. The optical modulator 220 outputs light having optical power of level 3 when a voltage is applied which provides a power transmittance of $T_3$. The power transmittances $T_0$ to $T_3$ illustrated in FIG. 2 each correspond to one of the four levels of optical power that can be provided by the optical signal generated by the optical modulator 220 when the DC bias voltage generated by the bias voltage generation unit 350 of the control unit 300 is $V_{bias}$.

In FIG. 2, "a" indicates the slope of the extinction curve between level 2 and level 1, "a+$\Delta a_{3\text{-}2}$" indicates the slope of the extinction curve between level 3 and level 2, and "a+$\Delta a_{1\text{-}0}$" indicates the slope of the extinction curve between level 1 and level 0. As can be seen from FIG. 2, "a" is a negative value, and the optical power of the output light decreases as the applied voltage increases. "$T_{Linear}$" is a power transmittance corresponding to a DC bias voltage generated by the bias voltage generation unit 350 in an ideal case based on the assumption that the slope of the extinction curve is constant "a" within a variation range of a voltage (electrical signal) applied to the optical modulator 220. "$T_{Nonlinear}$" is a power transmittance corresponding to a DC bias voltage generated by the bias voltage generation unit 350 in a case where the slope of the extinction curve is not completely linear within the variation range of the voltage applied to the optical modulator 220. The smaller a difference between the two slopes "a+$\Delta a_{3\text{-}2}$" and "a+$\Delta a_{1\text{-}0}$" illustrated in FIG. 2, the closer to an ideal value the DC bias voltage is. $V_{RF,p\text{-}p}$ represents a variation range of the voltage applied to the optical modulator 220. That is, $V_{RF,p\text{-}p}$ represents a variation range of the sum of the DC bias voltage and a voltage of an electrical signal for modulation. Since the DC bias voltage is constant, $V_{RF,p\text{-}p}$ matches a variation range of the voltage of the electrical signal for modulation.

When a difference between the power transmittances $T_{Nonlinear}$ and $T_{Linear}$ corresponding to the DC bias voltage is large, the DC bias voltage generated by the bias voltage generation unit 350 needs to be adjusted so that the power transmittance corresponding to the DC bias voltage approaches $T_{Linear}$. Given the difference in the power transmittance $\Delta T = T_{Nonlinear} - T_{Linear}$ between the case where the slope of the extinction curve is not completely linear and the ideal case assuming that the slope of the extinction curve is constant, $\Delta T$ can be estimated from a difference between the slope (a+$\Delta a_{3\text{-}2}$) of the extinction curve between level 3 and level 2 and the slope (a+$\Delta a_{1\text{-}0}$) of the extinction curve between level 1 and level 0. When there is no difference between an average value of the optical power in the case where the DC bias voltage is applied and optical modulation is performed with a linear extinction curve characteristic and the power of the optical signal output in the case where only the DC bias voltage is applied, the difference in the power transmittance resulting from a difference between the slope (a+$\Delta a_{3\text{-}2}$) and the slope (a+$\Delta a_{1\text{-}0}$) is proportional to a result of multiplying $V_{RF,p\text{-}p}$ by $\Delta a_{3\text{-}2} - \Delta a_{1\text{-}0}$ (difference between the slope (a+$\Delta a_{3\text{-}2}$) and the slope (a+$\Delta a_{1\text{-}0}$)). The positive or negative polarity of $\Delta a_{3\text{-}2} - \Delta a_{1\text{-}0}$ makes it possible to determine which of the intervals between level 3 and level 2 and between level 1 and level 0 is narrower. In the following description, the interval between level 3 and level 2 is referred to as a first interval, and the interval between level 1 and level 0 is referred to as a second interval. When the applied DC bias voltage becomes lower than the ideal voltage, the EA modulator cannot perform optical modulation in a region in which the extinction curve has a quasi-linear characteristic, and the difference between the optical power corresponding to level 3 and the optical power corresponding to level 2 is decreased, thereby increasing an error rate. Similarly, in the EA modulator, when the applied DC bias voltage becomes higher than the ideal voltage, the difference between the optical power corresponding to level 1 and the optical power corresponding to level 0 is decreased, thereby increasing the error rate.

The optical power of the optical signal output from the optical modulator 220 changes among four levels in correspondence to the four levels of the applied voltage of the electrical signal. In general, however, the value of the data signal which is an electrical signal for modulation is random, and it is considered that there is no significant difference in the frequency of application of each of the four levels of voltage to the optical modulator 220 in an appropriate observation time. As illustrated in FIG. 2, the DC bias voltage $V_{bias}$ is at the center of the variation range $V_{RF,p\text{-}p}$ of the voltage applied to the optical modulator 220. Therefore, when the DC bias voltage $V_{bias}$ is set to an appropriate value, an average value of the optical power of the optical signals output from the optical modulator 220 is close to the optical power of the optical signal output when only the DC bias voltage is applied. On the other hand, when the DC bias voltage $V_{bias}$ is not set to the appropriate value, the above-described first interval, i.e., an interval between the two larger ones of the four levels of optical power, or the above-described second interval, i.e., an interval between the two smaller ones levels of the four levels is narrowed. Specifically, the optical power at a second highest level approaches the optical power at a highest level, or the optical power at a second lowest level approaches the optical power at a lowest level. As a result, the average value of the optical power of the optical signals output from the optical modulator 220 in the extinction curve shifts to a higher level side or a lower level side, which results in an increase in the difference between the average value and the optical power of the optical signal output when only the DC bias voltage is applied. It is possible to determine whether the DC bias voltage is set to the appropriate value, by comparing the optical power of the optical signal output from the optical modulator 220 when the electrical signal for modulation and the DC bias voltage are applied with the optical power of the optical signal output from the optical modulator 220 when only the DC bias voltage is applied. It is also possible to determine whether the DC bias voltage is set to the appropriate value, by using the power transmittance instead of the optical power.

However, the optical modulator in operation cannot simultaneously observe the two different optical powers or power transmittances: the optical power or power transmittance of the output light when the electrical signal for modulation and the DC bias voltage are applied; and the optical power or power transmittance of the output light when only the DC bias voltage is applied. To address this issue, thus, the optical transmitter 200 according to the present embodiment is configured to include the observation optical modulator 230 in addition to the optical modulator 220 for optical modulation. Thus, it becomes possible to simultaneously observe the two different optical powers or power transmittances: the optical power or power transmittance of the output light when the electrical signal for modulation and the DC bias voltage are applied; and the optical power or power transmittance of the output light when only the DC bias voltage is applied. As a result, it becomes possible to determine whether the DC bias voltage is set to the appropriate value.

Generally, the power transmittance depends on the length of a waveguide for changing optical power, and the longer the waveguide, the larger the light absorption amount and the lower the power transmittance. Therefore, in order to make it possible to arbitrarily set the length of the waveguide of the observation optical modulator 230, not a power transmittance but a transmission loss per unit length is used as a physical quantity used in a process of determining which of the first interval and the second interval is narrower. Also in a case where the transmission loss per unit length is used, the principle for determining which of the first interval and the second interval is narrower is applicable.

Figure 3:
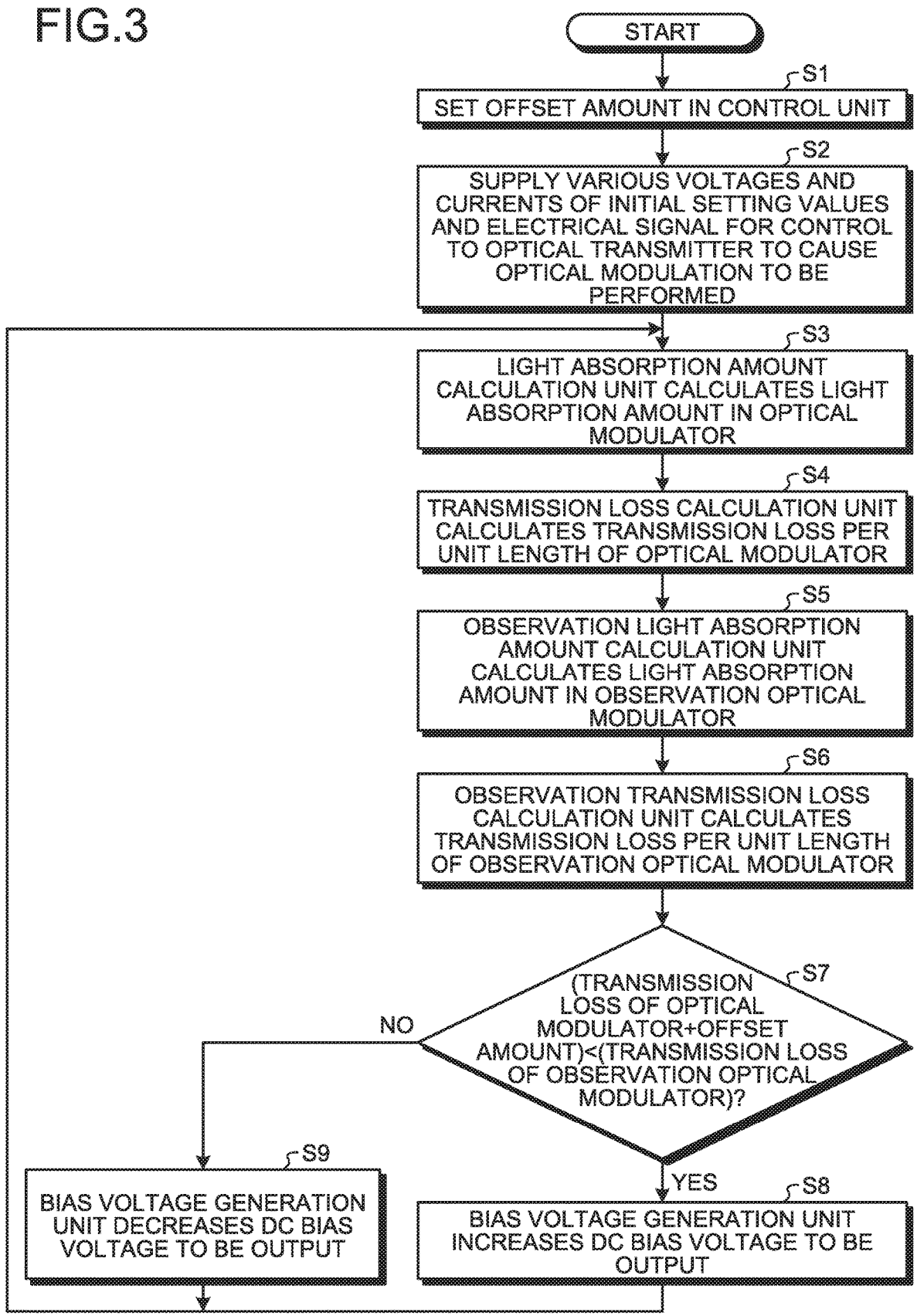
FIG. 3 is a flowchart illustrating an example operation of the optical transmission apparatus according to the first embodiment.

FIG. 3 is a flowchart illustrating an example operation of the optical transmission apparatus 100 according to the first embodiment, and illustrates an operation by the control unit 300 for adjusting the DC bias voltage applied to the optical transmitter 200.

First, before starting the operation of the optical transmission apparatus 100, an offset amount between a transmission loss in the case where only the DC bias voltage is applied and a transmission loss in the case where the DC bias voltage and the voltage of the electrical signal for modulation are applied in the extinction curve representing the characteristics of the optical modulator 220 is set in the control unit 300 (Step S1). The offset amount to be set means a difference between the two different transmission losses: a transmission loss in the optical modulator 220 in a case where the optical modulation is performed in a linear region of the extinction curve by using an electrical signal whose voltage variation range is $V_{RF\text{-}linear,p\text{-}p}$; and a transmission loss in the optical modulator 220 in the case where only the DC bias voltage is applied. Here, $V_{RF\text{-}linear,p\text{-}p}$ is a voltage range that is smaller than the above-described $V_{RF,p\text{-}p}$ illustrated in FIG. 2, to the extent that the nonlinearity of the extinction curve can be ignored. Setting the offset amount can enhance the accuracy of determination in the process for determining which of the first interval and the second interval is narrower in a case where when the set value of the DC bias voltage is appropriate, the following two power transmittances are different from each other: the power transmittance when only the DC bias voltage is applied; and the power transmittance at the time of optical modulation, that is, the power transmittance when the DC bias voltage and the electrical signal for modulation are applied. It is effective to provide the offset amount also for making the determination arbitrary. A user sets the offset amount by using, for example, an input device (not illustrated). The offset amount may be selected from a plurality of offset amounts prepared in advance, and set. The offset amount may be individually settable for a plurality of DC bias voltages.

Next, the control unit 300 supplies the optical transmitter 200 with various voltages and currents of predetermined initial setting values and an electrical signal for control, such that the optical modulator 220 performs optical modulation (Step S2). Specifically, the bias voltage generation unit 350 of the control unit 300 generates a DC bias voltage and supplies the generated DC bias voltage to the optical modulator 220 and the observation optical modulator 230 of the optical transmitter 200. Additionally, the modulation signal generation unit 360 generates an electrical signal for modulation and supplies the generated electrical signal to the optical modulator 220. The control unit 300 supplies a current to the continuous wave light generation unit 210. As a result, the continuous wave light generation unit 210 of the optical transmitter 200 starts generating continuous wave light, and inputs the generated continuous wave light to the optical modulator 220 and the observation optical modulator 230. The optical modulator 220 starts an operation of optically modulating the continuous wave light input from the continuous wave light generation unit 210 to thereby generate an optical signal. The observation optical modulator 230 starts an operation of attenuating the optical power of the continuous wave light input from the continuous wave light generation unit 210 with a power transmittance corresponding to the applied DC bias voltage.

Steps S1 and S2 are steps executed at the time of start of the operation of the optical transmission apparatus 100. After executing Steps S1 and S2, the optical transmission apparatus 100 repeats executing Steps S3 to S9 to adjust the DC bias voltage that the control unit 300 supplies to the optical modulator 220 and the observation optical modulator 230 of the optical transmitter 200.

After the execution of Step S2, the light absorption amount calculation unit 320 of the control unit 300 calculates a light absorption amount in the optical modulator 220 on the basis of information output from the optical transmitter 200 (Step S3). Examples of the information output from the optical transmitter 200 include information on a current or a voltage indicating the optical power of the continuous wave light input to the optical modulator 220 and information on a current or a voltage indicating the optical power of the optical signal output from the optical modulator 220.

Next, the transmission loss calculation unit 321 of the control unit 300 calculates a transmission loss per unit length of the optical modulator 220 on the basis of: the light absorption amount calculated by the light absorption amount calculation unit 320; and the length of the waveguide of the optical modulator 220 (Step S4). The transmission loss per unit length of the optical modulator 220 is a transmission loss per unit length in the waveguide of the optical modulator 220.

Next, the observation light absorption amount calculation unit 330 of the control unit 300 calculates a light absorption amount in the observation optical modulator 230 on the basis of information output from the observation optical modulator 230 (Step S5). Examples of the information output from the observation optical modulator 230 include information on a current or a voltage indicating the optical power of the continuous wave light input to the observation optical modulator 230 and information on a current or a voltage indicating optical power of an optical signal output from the observation optical modulator 230.

Next, the observation transmission loss calculation unit 331 of the control unit 300 calculates a transmission loss per unit length of the observation optical modulator 230 on the basis of: the light absorption amount calculated by the observation light absorption amount calculation unit 330; and the length of the waveguide included in the observation optical modulator 230 (Step S6). The transmission loss per unit length of the observation optical modulator 230 is a transmission loss per unit length in the waveguide of the observation optical modulator 230.

Next, the bias voltage control unit 340 of the control unit 300 controls the DC bias voltage generated by the bias voltage generation unit 350, on the basis of the transmission loss per unit length of the optical modulator 220 calculated in Step S4 and the transmission loss per unit length in the observation optical modulator 230 calculated in Step S6.

Specifically, the bias voltage control unit 340 first compares the transmission loss per unit length of the observation optical modulator 230 with a value obtained by adding an offset amount to the transmission loss per unit length of the optical modulator 220 (Step S7). The offset amount added to the transmission loss per unit length of the optical modulator 220 is the offset amount set in Step S1. The term "TRANSMISSION LOSS" in Step 7 of FIG. 3 means "transmission loss per unit length".

Next, when the value obtained by adding the offset amount to the transmission loss per unit length of the optical modulator 220 is smaller than the transmission loss of the observation optical modulator 230 (Step S7: Yes), the bias voltage control unit 340 instructs the bias voltage generation unit 350 to increase the DC bias voltage. Receiving this instruction, the bias voltage generation unit 350 increases the DC bias voltage to be generated (Step S8). The case where the value obtained by adding the offset amount to the transmission loss per unit length of the optical modulator 220 is smaller than the transmission loss of the observation optical modulator 230 corresponds to a case where $\Delta T=T_{Nonlinear}-T_{Linear}$ illustrated in FIG. 2 is less than 0, that is, a case of $T_{Nonlinear}<T_{Linear}$.

When the value obtained by adding the offset amount to the transmission loss per unit length of the optical modulator 220 is equal to or larger than the transmission loss of the observation optical modulator 230 (Step S7: No), the bias voltage control unit 340 instructs the bias voltage generation unit 350 to decrease the DC bias voltage. Receiving this instruction, the bias voltage generation unit 350 decreases the DC bias voltage to be generated (Step S9). The case where the value obtained by adding the offset amount to the transmission loss per unit length of the optical modulator 220 is equal to or larger than the transmission loss of the observation optical modulator 230 corresponds to a case where $\Delta T=T_{Nonlinear}-T_{Linear}$ illustrated in FIG. 2 is equal to or greater than 0, that is, a case of $T_{Linear} \le T_{Nonlinear}$.

After executing Steps S8 and S9, the control unit 300 returns to Step S3 to continue the operation. In a case where the value obtained by adding the offset amount to the transmission loss per unit length of the optical modulator 220 is equal to the transmission loss of the observation optical modulator 230, that is, in a case of $\Delta T=0$, the bias voltage control unit 340 does not have to instruct the bias voltage generation unit 350 to change the DC bias voltage.

Here, the amount by which the DC bias voltage is adjusted in each of Steps S8 and S9 may be a predetermined fixed value or may be changed depending on the polarity and an absolute value of $\Delta T$. In the case of changing the adjustment amounts depending on the polarity and the absolute value of $\Delta T$, for example, the bias voltage control unit 340 retains a table in which a plurality of the adjustment amounts is registered. The bias voltage control unit 340 selects, from among the adjustment amounts registered in the table, an adjustment amount corresponding to the polarity and the absolute value of $\Delta T$, and instructs the bias voltage generation unit 350 to adjust the DC bias voltage accordingly. In addition, when the same determination result is repeatedly obtained in Step S7, the bias voltage control unit 340 may increase the adjustment amount stepwise within a range not exceeding a predetermined maximum amount.

Figure 4:
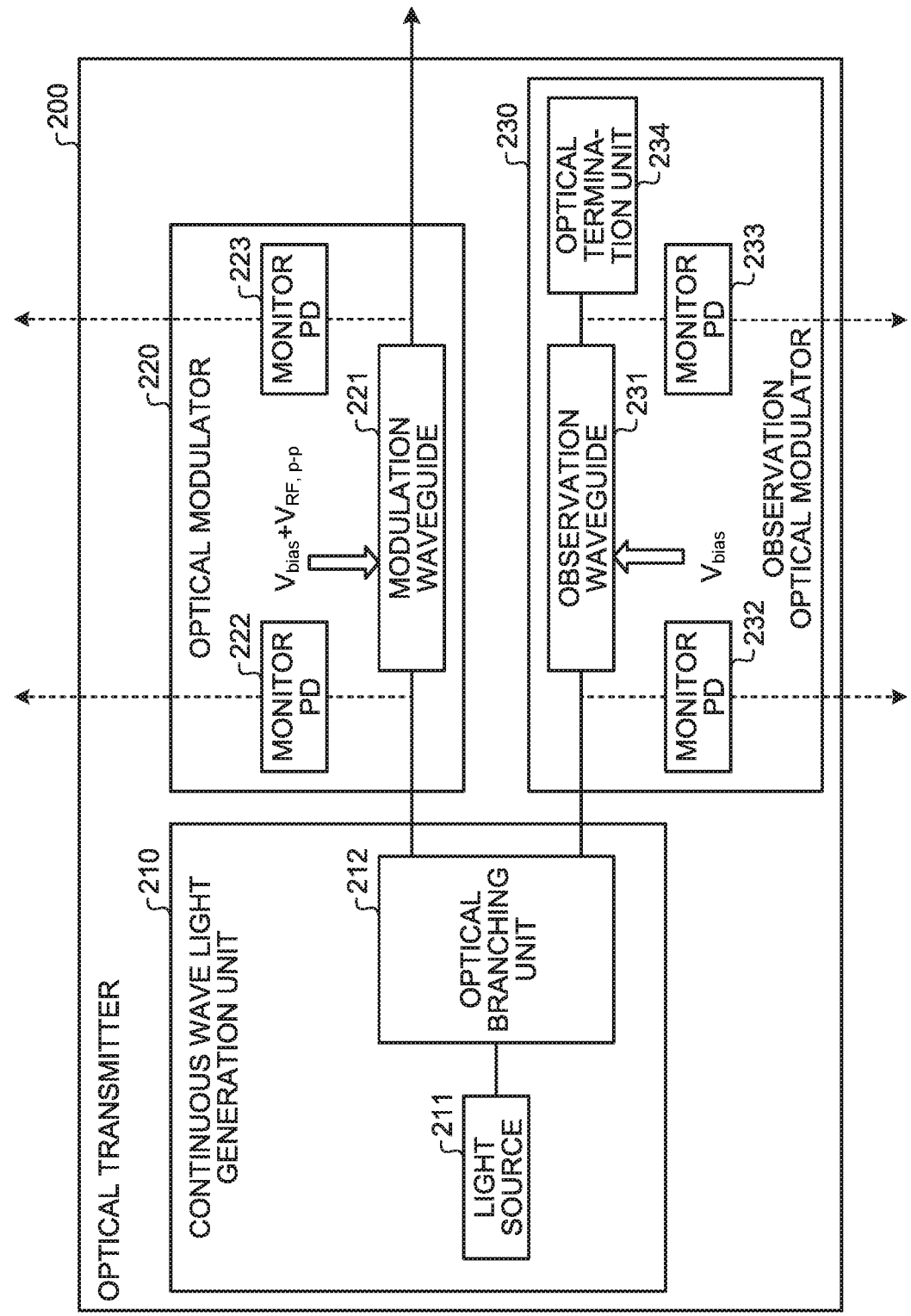
FIG. 4 is a diagram illustrating an example configuration of the optical transmitter according to the first embodiment.

Next, configurations of the continuous wave light generation unit 210, the optical modulator 220, and the observation optical modulator 230 of the optical transmitter 200 will be described. FIG. 4 is a diagram illustrating an example configuration of the optical transmitter 200 according to the first embodiment.

The continuous wave light generation unit 210 of the optical transmitter 200 includes a light source 211 and an optical branching unit 212. The light source 211, which is a laser diode (LD), generates continuous wave light as a source of an optical signal when supplied with an injection current from the outside. The optical branching unit 212 distributes the continuous wave light generated by the light source 211, to the optical modulator 220 and the observation optical modulator 230. The optical branching unit 212 can be implemented by an optical directional coupler, a multi-mode interference waveguide, and the like.

The optical modulator 220 of the optical transmitter 200 includes a modulation waveguide 221, a monitor photodiode (PD) 222, and a monitor photodiode (PD) 223. The monitor PD 222 and the monitor PD 223 are light receiving elements for observing optical power.

The DC bias voltage $V_{bias}$ generated by the bias voltage generation unit 350 of the control unit 300 and the voltage of the electrical signal for modulation generated by the modulation signal generation unit 360 of the control unit 300 are applied to the modulation waveguide 221 which is a first waveguide. The modulation waveguide 221 is made up of an optical device that allows a transmittance to change in correspondence to a value of an applied voltage.

The monitor PD 222 is connected to an input side of the modulation waveguide 221, that is, to the side to which the continuous wave light is input from the continuous wave light generation unit 210. The monitor PD 222 observes optical power of the continuous wave light input to the modulation waveguide 221. That is, the monitor PD 222 is configured to receive a continuous wave light branching off the continuous wave light that is to be input to the modulation waveguide 221. The monitor PD 222 converts the continuous wave light input thereto, into an electrical signal, and outputs a current corresponding to the optical power of the continuous wave light.

The monitor PD 223 is connected to an output side of the modulation waveguide 221, and observes optical power of an optical signal generated by the modulation waveguide 221 modulating the continuous wave light. That is, the monitor PD 223 is configured to receive an optical signal branching off from the optical signal output from the modulation waveguide 221. The monitor PD 223 converts the optical signal input thereto, into an electrical signal, and outputs a current corresponding to the optical power of the optical signal.

The current output from the monitor PD 222 and the current output from the monitor PD 223 are input to the light absorption amount calculation unit 320 of the control unit 300. The monitor PDs 222 and 223 may convert a current corresponding to the observed optical power into a voltage and output the voltage. The light absorption amount calculation unit 320 calculates a light absorption amount in the optical modulator 220, using the current or the voltage output from the monitor PDs 222 and 223.

The observation optical modulator 230 of the optical transmitter 200 includes an observation waveguide 231, monitor PDs 232 and 233, and an optical termination unit 234. The monitor PDs 232 and 233 are light receiving elements for observing optical power.

The DC bias voltage $V_{bias}$ generated by the bias voltage generation unit 350 of the control unit 300 is applied to the observation waveguide 231 which is a second waveguide. The observation waveguide 231 is made up of an optical device that allows a transmittance to change in correspondence to a value of an applied voltage.

The monitor PD 232 is connected to an input side of the observation waveguide 231, that is, to the side to which the continuous wave light is input from the continuous wave light generation unit 210. The monitor PD 232 observes optical power of the continuous wave light input to the observation waveguide 231. That is, the monitor PD 232 is configured to receive a continuous wave light branching off from the continuous wave light that is to be input to the observation waveguide 231. The monitor PD 232 converts the continuous wave light input thereto, into an electrical signal, and outputs a current corresponding to the optical power of the continuous wave light.

The monitor PD 233 is connected to an output side of the observation waveguide 231, that is, to the side opposite to a side to which the continuous wave light generation unit 210 is connected. The monitor PD 233 observes optical power of the continuous wave light having passed through the observation waveguide 231. That is, the monitor PD 233 is configured to receive a continuous wave light branching off from the continuous wave light output from the observation waveguide 231. The monitor PD 233 converts the continuous wave light input thereto, into an electrical signal, and outputs a current corresponding to the optical power of the continuous wave light.

The current output from the monitor PD 232 and the current output from the monitor PD 233 are input to the observation light absorption amount calculation unit 330 of the control unit 300. The monitor PDs 232 and 233 may convert a current corresponding to the observed optical power into a voltage and output the voltage. The observation light absorption amount calculation unit 330 calculates a light absorption amount in the observation optical modulator 230, using the current or the voltage output from the monitor PDs 232 and 233.

The optical termination unit 234 is made up of an optical terminator, and terminates the continuous wave light which has passed through the observation waveguide 231.

Figure 5:
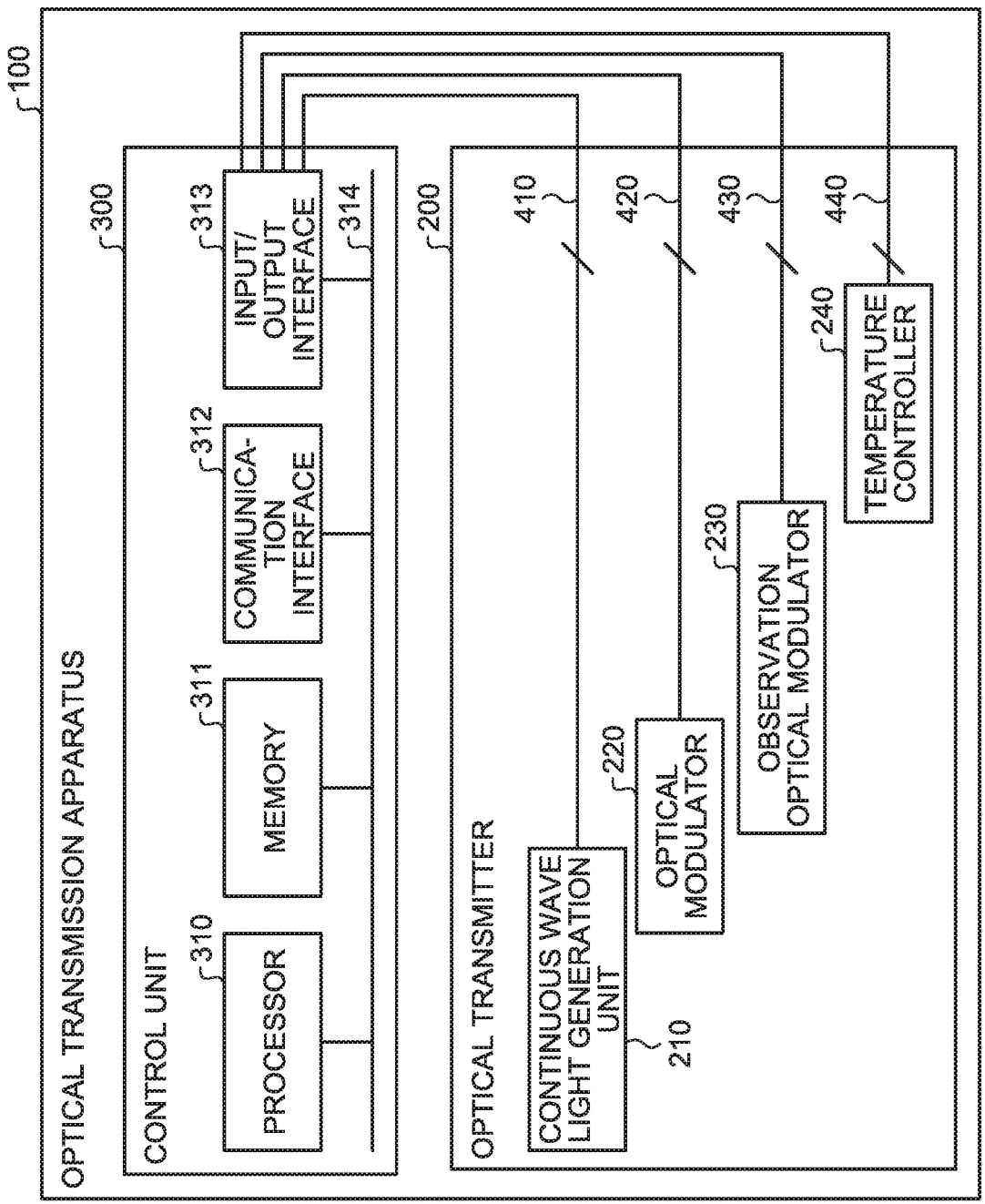
FIG. 5 is a diagram illustrating an example configuration of hardware that implements the optical transmission apparatus according to the first embodiment.

Next, a hardware configuration of the optical transmission apparatus 100 will be described. FIG. 5 is a diagram illustrating an example configuration of hardware that implements the optical transmission apparatus 100 according to the first embodiment.

In addition to the continuous wave light generation unit 210, the optical modulator 220, and the observation optical modulator 230 having the above-described configuration, the optical transmitter 200 includes a temperature controller 240 that controls temperatures of electrical components and optical devices of the optical transmitter 200.

The control unit 300 can be implemented by a processor 310 such as a central processing unit (CPU) and a system large scale integration (LSI), a memory 311 including a random access memory (RAM) and a read only memory (ROM), a communication interface 312, and an input/output interface 313. The processor 310, the memory 311, the communication interface 312, and the input/output interface 313 are connected to a bus 314 and are capable of passing data and signals such as control signals to each other via the bus 314. Various data, programs, and the like are stored in the memory 311. The communication interface 312 is used for transmitting and receiving data, control signals, and the like to and from various components (not illustrated) inside the optical transmission apparatus 100. The communication interface 312 is also used for transmitting and receiving data, control signals, and the like to and from various components or devices outside the optical transmission apparatus 100.

The input/output interface 313 is used when the control unit 300 transmits and receives control signals to and from the optical transmitter 200 connected via electric wirings 410 to 440, and the like. The input/output interface 313 is used, for example, when the control unit 300 outputs an injection current for generating light to the continuous wave light generation unit 210. In addition, in a case where the control unit 300 outputs the DC bias voltage and the electrical signal for modulation to the optical modulator 220, when the control unit 300 acquires a current or a voltage indicating optical power, the input/output interface 313 is used. In addition, in a case where the control unit 300 outputs the DC bias voltage to the observation optical modulator 230, when the control unit 300 acquires a current or a voltage indicating optical power, the input/output interface 313 is used. Furthermore, in a case where the control unit 300 outputs a current or a voltage for temperature control to the temperature controller 240, the input/output interface 313 is used.

The light absorption amount calculation unit 320, the transmission loss calculation unit 321, the observation light absorption amount calculation unit 330, the observation transmission loss calculation unit 331, the bias voltage control unit 340, and the modulation signal generation unit 360 of the control unit 300 are implemented by the processor 310 executing programs stored in the memory 311 for operation of the above units as respective units of the optical transmission apparatus 100.

As described above, in the optical transmission apparatus 100 according to the present embodiment, the optical transmitter 200 includes the optical modulator 220 and the observation optical modulator 230. Also, the control unit 300 controls the DC bias voltage output to the optical transmitter 200 on the basis of: the absorption amount of the optical power in the optical modulator 220 as the continuous wave light is pulse amplitude modulated; and the absorption amount of the optical power in the observation optical modulator 230 which does not modulate the continuous wave light. Specifically, the control unit 300 supplies the DC bias voltage and the electrical signal for modulation to the optical modulator 220 to calculate a transmission loss per unit length in the optical modulator 220, and supplies the DC bias voltage to the observation optical modulator 230 to calculate a transmission loss per unit length in the observation optical modulator 230. The control unit 300 adjusts the DC bias voltage so as to bring the DC bias voltage close to an ideal value, on the basis of the transmission loss per unit length in the optical modulator 220 and the transmission loss per unit length in the observation optical modulator 230. Thus, the optical transmission apparatus 100 can prevent deterioration of transmission quality as described below.

Figure 6:
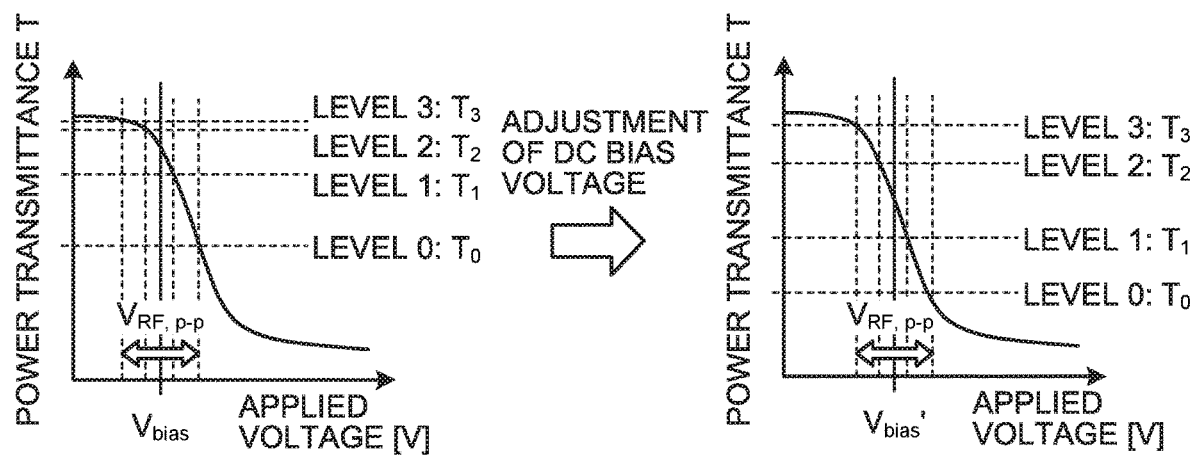
FIG. 6 is a diagram for explaining an effect of the optical transmission apparatus according to the first embodiment.

FIG. 6 is a diagram for explaining the effect of the optical transmission apparatus 100 according to the first embodiment. The left side of FIG. 6 illustrates a state in which a difference between the power transmittances at level 3 and level 2 is smaller than a difference between the power transmittances at level 1 and level 0 due to the nonlinearity of the extinction curve when the DC bias voltage is set to an inappropriate value. The difference in the power transmittance leads to a difference between the intervals among the levels of the optical power of the optical signal, the optical power varying among four levels. In the state illustrated on the left side of FIG. 6, an interval between the optical power corresponding to the power transmittance $T_3$ and the optical power corresponding to the power transmittance $T_2$ is narrower than an interval between the optical power corresponding to the power transmittance $T_2$ and the optical power corresponding to the power transmittance $T_1$ and than an interval between the optical power corresponding to the power transmittance $T_1$ and the optical power corresponding to the power transmittance $T_0$. By performing the control described above, it becomes possible to detect the increased difference between the intervals among the levels of the optical power, thereby adjusting the DC bias voltage adaptively. In the example illustrated in FIG. 6, the DC bias voltage $V_{bias}$ is adjusted to increase from the state illustrated on the left side of FIG. 6 to $V_{bias}'$. Thus, as illustrated on the right side of FIG. 6, the difference between the power transmittances at level 3 and level 2 is increased. As a result, the interval between the optical power corresponding to the power transmittance $T_3$ and the optical power corresponding to the power transmittance $T_2$ is increased. As described above, in the optical transmission apparatus 100, the control unit 300 checks whether the DC bias voltage applied to the optical transmitter 200 is an appropriate value. When the DC bias voltage is an inappropriate value, the control unit 300 adjusts the DC bias voltage to bring the DC bias voltage close to the appropriate value. It thus becomes possible to prevent deterioration of the transmission quality of the optical signal by preventing the DC bias value from deviating from the appropriate value due to factors such as changes in driving conditions, environmental conditions of the optical transmitter 200, and aging deterioration thereof.

Second Embodiment

Figure 7:
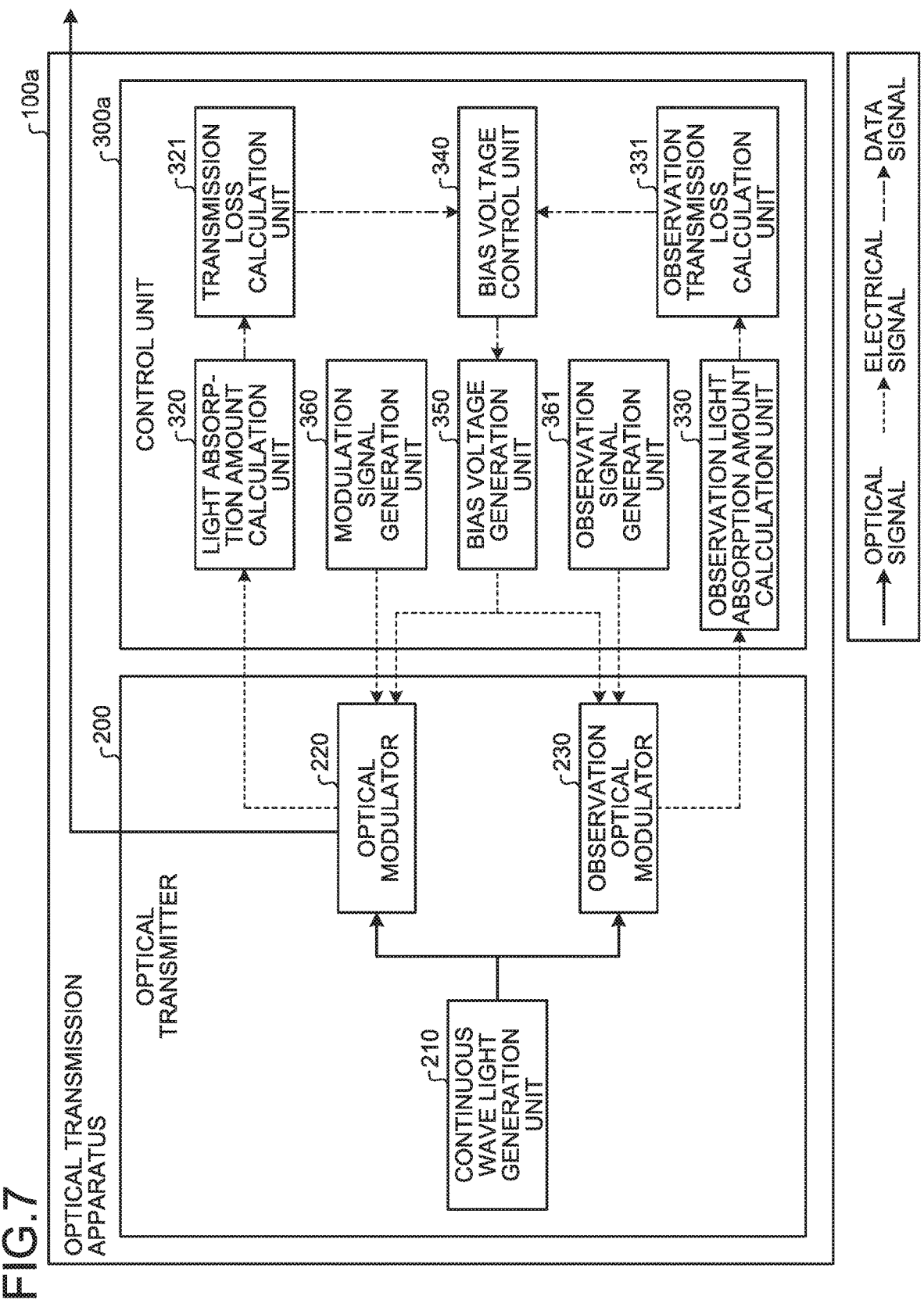
FIG. 7 is a diagram illustrating an example configuration of an optical transmission apparatus according to a second embodiment.

FIG. 7 is a diagram illustrating an example configuration of an optical transmission apparatus according to a second embodiment. The optical transmission apparatus 100a according to the second embodiment differs from the optical transmission apparatus 100 according to the first embodiment in that a control unit 300a of the optical transmission apparatus 100a replaces the control unit 300 of the optical transmission apparatus 100. The control unit 300a is the control unit 300 with an observation signal generation unit 361 added. The observation signal generation unit 361 is a second modulation signal generation unit. A description of the present embodiment will focus on a different part of the optical transmission apparatus 100a from the optical transmission apparatus 100 according to the first embodiment.

Similarly to the modulation signal generation unit 360, the observation signal generation unit 361 of the control unit 300a generates an electrical signal whose voltage changes at a high speed, and applies the generated electrical signal to the observation optical modulator 230. It is noted that a variation range of the voltage of the electrical signal generated by the observation signal generation unit 361, that is, a difference between a maximum value and a minimum value of the four levels of output voltages is smaller than a difference between a maximum value and a minimum value of a voltage of an electrical signal for modulation generated by the modulation signal generation unit 360. Specifically, the observation signal generation unit 361 generates an electrical signal with which optical modulation can be performed in the linear region of the extinction curve. That is, the observation signal generation unit 361 generates some kind of electrical signal whose voltage variation range falls within the linear region of the extinction curve.

The operation of the optical transmission apparatus 100a is similar to that of the optical transmission apparatus 100 according to the first embodiment except that the observation signal generation unit 361 generates an electrical signal, and the observation optical modulator 230 performs optical modulation, using a DC bias voltage and the electrical signal generated by the observation signal generation unit 361.

The optical transmission apparatus 100a according to the present embodiment can be implemented by hardware having the configuration illustrated in FIG. 5, similarly to the optical transmission apparatus 100 according to the first embodiment.

An effect of the second embodiment will be described. Applying, in addition to the DC bias voltage, an electrical signal with which optical modulation can be performed in the linear region of the extinction curve to the observation optical modulator 230 makes it possible to obtain a transmission loss in a case where optical modulation using a high-frequency electrical signal is performed in the linear region of the extinction curve. Also in that case, as in the first embodiment, it is possible to determine whether intervals between adjacent levels of optical power varying among the four levels are appropriate, thus adjusting the DC bias voltage to bring the DC bias voltage close to an appropriate value.

Third Embodiment

Figure 8:
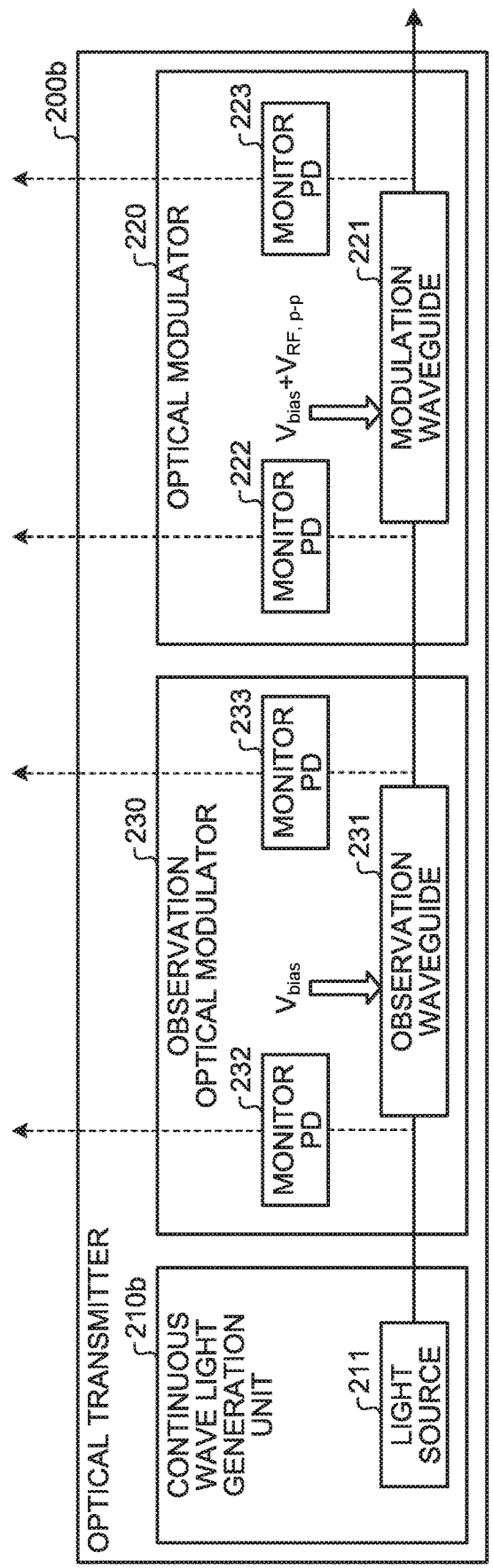
FIG. 8 is a diagram illustrating an example configuration of an optical transmitter of an optical transmission apparatus according to a third embodiment.

FIG. 8 is a diagram illustrating an example configuration of an optical transmitter of an optical transmission apparatus according to a third embodiment. The optical transmission apparatus according to the third embodiment differs from the optical transmission apparatus 100 according to the first embodiment in that an optical transmitter 200b having a configuration illustrated in FIG. 8 replaces the optical transmitter 200. A description of the present embodiment will focus on a different part of the optical transmission apparatus of the third embodiment from the optical transmission apparatus 100 according to the first embodiment.

The optical transmitter 200b includes a continuous wave light generation unit 210b, the optical modulator 220, and the observation optical modulator 230. The optical modulator 220 and the observation optical modulator 230 are the same as the optical modulator 220 and the observation optical modulator 230 of the optical transmitter 200 according to the first embodiment. However, the modulators 220, 230 of the optical transmitter 200b are connected to each other in a different manner from those of the optical transmitter 200.

In the optical transmitter 200b, the continuous wave light generation unit 210b includes the light source 211. The light source 211 is the same as the light source 211 constituting the continuous wave light generation unit 210 of the optical transmitter 200 according to the first embodiment.

In the optical transmitter 200b, the continuous wave light generation unit 210b, the optical modulator 220, and the observation optical modulator 230 are connected in series, and continuous wave light generated in the continuous wave light generation unit 210b passes through the observation optical modulator 230 and then is input to the optical modulator 220. The order of the optical modulator 220 and the observation optical modulator 230 may be reversed. In that case, the continuous wave light generated by the continuous wave light generation unit 210b passes through the optical modulator 220 and then is input to the observation optical modulator 230.

The optical power of the continuous wave light is reduced in the observation optical modulator 230. The length of the observation waveguide 231 of the observation optical modulator 230 is shorter than that of the modulation waveguide 221 of the optical modulator 220 so that the amount of decrease in the optical power in the observation optical modulator 230 is reduced.

Because there is only a negligible error between a result of monitoring by the monitor PD 233 of the observation optical modulator 230 and a result of monitoring by the monitor PD 222 of the optical modulator 220, these monitor PDs may be shared and only one of the monitor PDs 233 and 222. In that case, the optical transmitter 200b outputs a result of monitoring by the shared monitor PD to the light absorption amount calculation unit 320 and the observation light absorption amount calculation unit 330 of the control unit 300.

The optical transmission apparatus according to the present embodiment can be implemented by hardware having the configuration illustrated in FIG. 5, similarly to the optical transmission apparatus 100 according to the first embodiment.

According to the present embodiment, it is possible to provide an optical transmission apparatus which can obtain an effect similar to those of the first and second embodiments with a small number of components.

Fourth Embodiment

Figure 9:
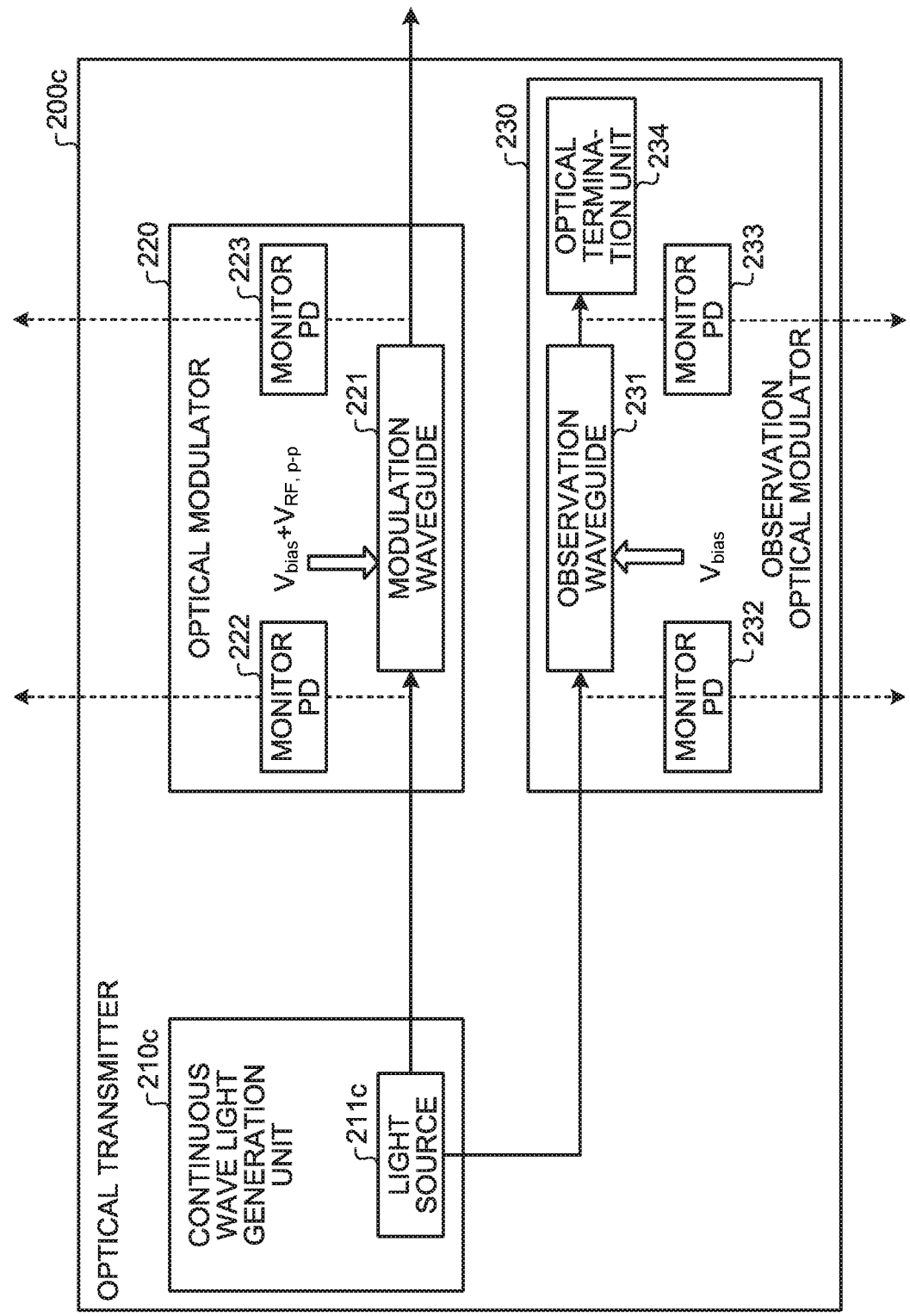
FIG. 9 is a diagram illustrating an example configuration of an optical transmitter of an optical transmission apparatus according to a fourth embodiment.

FIG. 9 is a diagram illustrating an example configuration of an optical transmitter of an optical transmission apparatus according to a fourth embodiment. The optical transmission apparatus according to the fourth embodiment differs from the optical transmission apparatus 100 according to the first embodiment in that with an optical transmitter 200c having a configuration illustrated in FIG. 9 replaces the optical transmitter 200 of the optical transmission apparatus 100. A description of the present embodiment will focus on a different part of the optical transmission apparatus of the fourth embodiment from the optical transmission apparatus 100 according to the first embodiment.

The optical transmitter 200c includes a continuous wave light generation unit 210c, the optical modulator 220, and the observation optical modulator 230. The optical modulator 220 and the observation optical modulator 230 are the same as the optical modulator 220 and the observation optical modulator 230 of the optical transmitter 200 according to the first embodiment. However, the modulators 220, 230 of the optical transmitter 200c are connected to the continuous wave light generation unit 210c in a different manner from that in the first embodiment.

In the optical transmitter 200c, the continuous wave light generation unit 210c includes a light source 211c. The light source 211c is a general light source capable of generating continuous wave light and has a resonator structure formed of a pair of facing mirrors. A light source having a resonator structure can easily extract continuous wave light from each mirror. Therefore, the light source 211c extracts the continuous wave light from one of the pair of facing mirrors and outputs the extracted continuous wave light to the optical modulator 220. Also, the light source 211c extracts the continuous wave light from the other of the facing mirrors and outputs the extracted continuous wave light to the observation optical modulator 230.

The forth embodiment has been described as to the case where the optical transmitter 200 of the optical transmission apparatus 100 according to the first embodiment illustrated in FIG. 1 is replaced with the optical transmitter 200c, but the optical transmitter 200 of the optical transmission apparatus 100a according to the second embodiment illustrated in FIG. 7 may be replaced with the optical transmitter 200c.

The optical transmission apparatus according to the present embodiment can be implemented by hardware having the configuration illustrated in FIG. 5, similarly to the optical transmission apparatus 100 according to the first embodiment.

According to the present embodiment, it is possible to provide an optical transmission apparatus which can obtain an effect similar to those of the first and second embodiments with a small number of components.

Fifth Embodiment

In the optical transmission apparatus according to each of the first to fourth embodiments, the light absorption amount is calculated on the basis of the optical power observed using a photodiode, but the light absorption amount may be calculated on the basis of a result of monitoring a photocurrent generated when light absorption occurs in the waveguide. For a waveguide that absorbs light in an absorption amount corresponding to an applied voltage in an EA modulator, when light is absorbed, a photocurrent is generated between electrodes to which a voltage is applied. Because the photocurrent has a value corresponding to the light absorption amount, the light absorption amount can be calculated on the basis of an observation result of the generated photocurrent.

Figure 10:
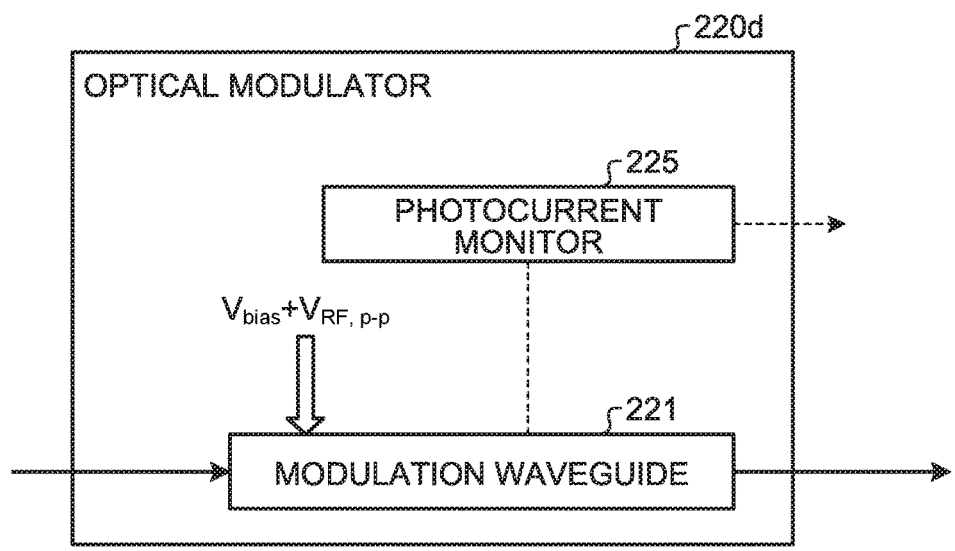
FIG. 10 is a diagram illustrating an example configuration of an optical modulator of an optical transmitter of an optical transmission apparatus according to a fifth embodiment.
Figure 11:
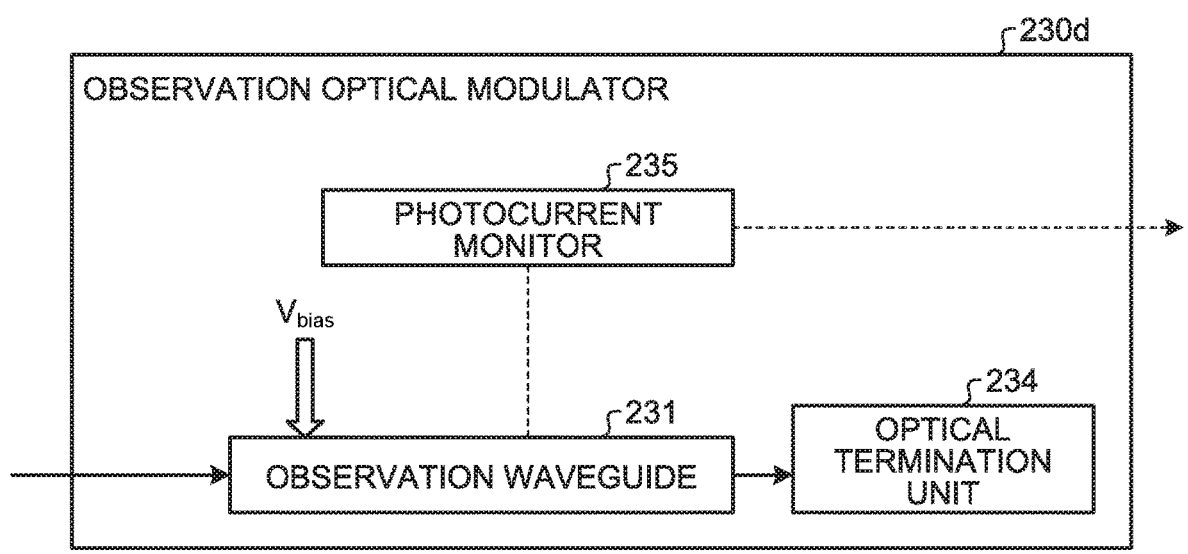
FIG. 11 is a diagram illustrating an example configuration of an observation optical modulator of the optical transmitter of the optical transmission apparatus according to the fifth embodiment.

An optical transmission apparatus according to a fifth embodiment differs from the optical transmission apparatus according to each of the first to fourth embodiments in that an optical modulator 220d illustrated in FIG. 10 and an observation optical modulator 230d illustrated in FIG. 11 replaces the optical modulator and the observation optical modulator constituting the optical transmitter of the optical transmission apparatus according to each of the first to fourth embodiments.

FIG. 10 is a diagram illustrating an example configuration of the optical modulator of the optical transmitter of the optical transmission apparatus according to the fifth embodiment. FIG. 11 is a diagram illustrating an example configuration of the observation optical modulator of the optical transmitter of the optical transmission apparatus according to the fifth embodiment.

As illustrated in FIG. 10, the optical modulator 220d according to the fifth embodiment includes the modulation waveguide 221 and a photocurrent monitor 225. The modulation waveguide 221 is the same as the modulation waveguide 221 of the optical modulator 220 according to the first embodiment illustrated in FIG. 4. The photocurrent monitor 225, which is, for example, a current sensor, observes a photocurrent generated in the modulation waveguide 221. The photocurrent monitor 225 outputs a result of the observation to the light absorption amount calculation unit 320. The light absorption amount calculation unit 320 calculates a light absorption amount in the modulation waveguide 221 on the basis of a value of the current observed by the photocurrent monitor 225.

As illustrated in FIG. 11, the observation optical modulator 230d according to the fifth embodiment includes the observation waveguide 231, the optical termination unit 234, and a photocurrent monitor 235. The observation waveguide 231 and the optical termination unit 234 are the same as the observation waveguide 231 and the optical termination unit 234 of the observation optical modulator 230 according to the first embodiment illustrated in FIG. 4. The photocurrent monitor 235, which is, for example, a current sensor, observes a photocurrent generated in the observation waveguide 231. The photocurrent monitor 235 outputs a result of the observation to the observation light absorption amount calculation unit 330. The observation light absorption amount calculation unit 330 calculates a light absorption amount in the observation waveguide 231 on the basis of a value of the current observed by the photocurrent monitor 235.

The optical transmission apparatus according to the present embodiment can be implemented by hardware having the configuration illustrated in FIG. 5, similarly to the optical transmission apparatus 100 according to the first embodiment.

As described above, in the optical transmission apparatus according to the present embodiment, the light absorption amount is calculated on the basis of the observed value of the photocurrent generated in the waveguide when light is absorbed, and the DC bias voltage is adjusted on the basis of the calculated light absorption amount. The same effects as those of the optical transmission apparatuses according to the first to fourth embodiments can be obtained also in the optical transmission apparatus according to the present embodiment.

Sixth Embodiment

Figure 12:
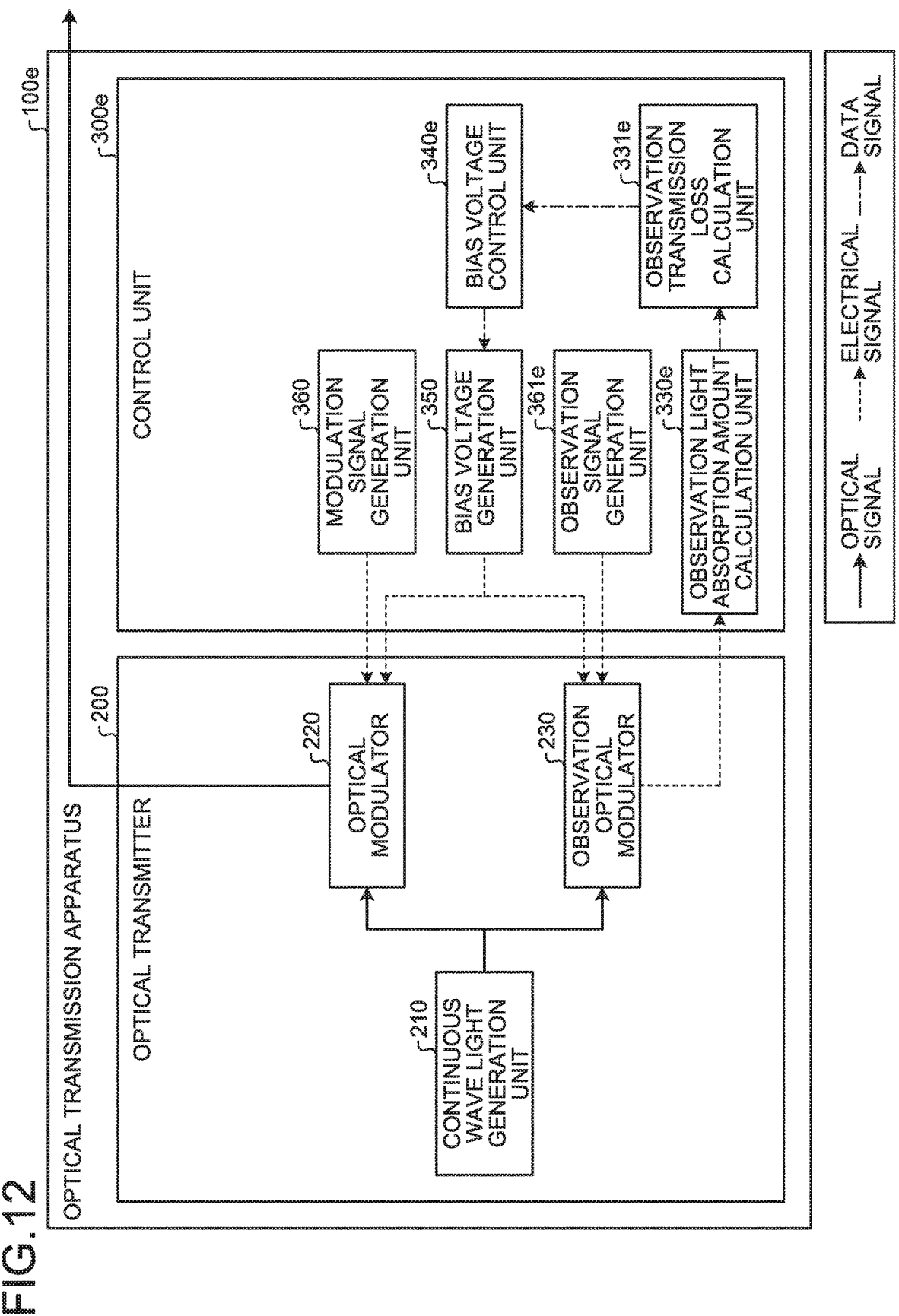
FIG. 12 is a diagram illustrating an example configuration of an optical transmission apparatus according to a sixth embodiment.

FIG. 12 is a diagram illustrating an example configuration of an optical transmission apparatus according to a sixth embodiment. The optical transmission apparatus 100e according to the sixth embodiment differs from the optical transmission apparatus 100 according to the first embodiment in that a control unit 300e replaces the control unit 300 of the optical transmission apparatus 100 according to the first embodiment.

The control unit 300e includes an observation light absorption amount calculation unit 330e, an observation transmission loss calculation unit 331e, a bias voltage control unit 340e, the bias voltage generation unit 350, the modulation signal generation unit 360, and an observation signal generation unit 361e. The bias voltage generation unit 350 and the modulation signal generation unit 360 are the same as the bias voltage generation unit 350 and the modulation signal generation unit 360 of the control unit 300 of the optical transmission apparatus 100 according to the first embodiment.

The observation signal generation unit 361e sequentially generates voltages each of which is equal in level to a corresponding one of voltages that can be provided by the electrical signal for modulation output from the modulation signal generation unit 360. That is, the observation signal generation unit 361e sequentially generates four voltages of levels each of which is equal to a corresponding one of four levels of voltages output from the modulation signal generation unit 360. The observation signal generation unit 361e applies the generated voltages to the observation optical modulator 230. Here, the observation signal generation unit 361e applies the voltages of respective levels to the observation optical modulator 230 for a time longer than a response time of light receiving elements of the observation optical modulator 230.

The observation light absorption amount calculation unit 330e calculates a light absorption amount resulting from a process in which the observation optical modulator 230 of the optical transmitter 200 changes optical power of continuous wave light. That is, the observation light absorption amount calculation unit 330e calculates a light absorption amount in the observation optical modulator 230. The observation light absorption amount calculation unit 330e calculates the light absorption amount on the basis of a voltage value or a current value indicating the optical power output from the observation optical modulator 230. Here, the DC bias voltage generated by the bias voltage generation unit 350 and the voltage generated by the observation signal generation unit 361e are applied to the observation optical modulator 230. Since the voltage generated by the observation signal generation unit 361e changes among four levels, the light absorption amount in the observation optical modulator 230 also changes among four levels. Therefore, the observation light absorption amount calculation unit 330e calculates each of the four levels of light absorption amounts in the observation optical modulator 230.

The observation transmission loss calculation unit 331e calculates a transmission loss per unit length of the observation waveguide 231 of the observation optical modulator 230 on the basis of the light absorption amount calculated by the observation light absorption amount calculation unit 330e. It is noted that the observation transmission loss calculation unit 331e retains in advance information on the length of the observation waveguide 231 of the observation optical modulator 230. Since the observation light absorption amount calculation unit 330e calculates each of the four levels of the light absorption amounts as described above, the observation transmission loss calculation unit 331e calculates a transmission loss per unit length of the observation waveguide 231 for each of the four levels of the light absorption amounts.

The bias voltage control unit 340e controls the DC bias voltage generated by the bias voltage generation unit 350 on the basis of the four transmission losses per unit length calculated by the observation transmission loss calculation unit 331e.

The optical modulator 220 of the optical transmitter 200 may omit the monitor PDs 222 and 223 illustrated in, for example, FIG. 4.

The optical transmitter 200 may be replaced with an optical transmitter having the configuration described in each of the third to fifth embodiments.

Next, a description will be made as to an operation of the optical transmission apparatus 100e, specifically, an operation by the control unit 300e for adaptively adjusting the DC bias voltage applied to the optical transmitter 200.

Figure 13:
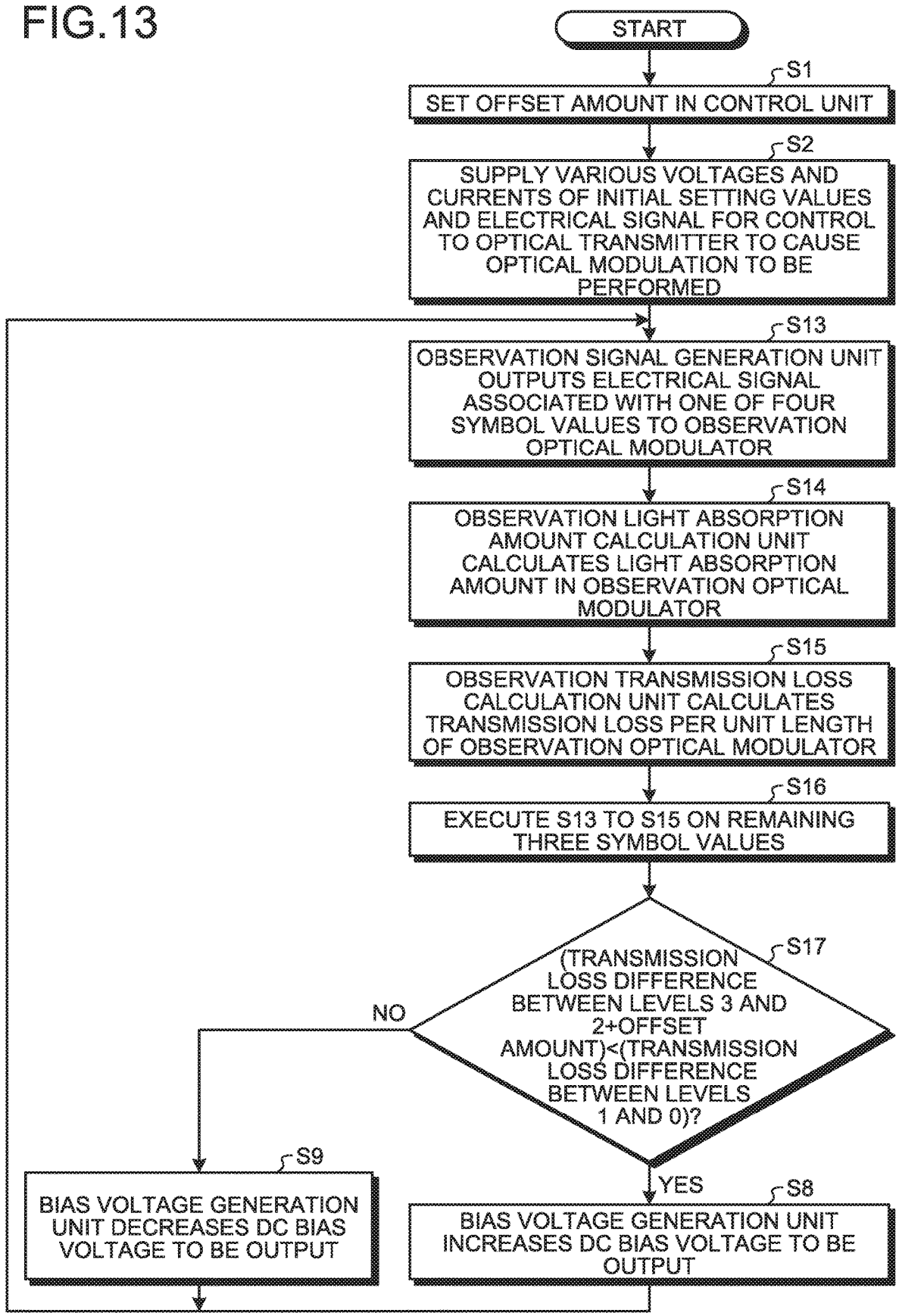
FIG. 13 is a flowchart illustrating an example operation of the optical transmission apparatus according to the sixth embodiment.

FIG. 13 is a flowchart illustrating an example operation of the optical transmission apparatus 100e according to the sixth embodiment, and illustrates an operation by the control unit 300e for adjusting the DC bias voltage applied to the optical transmitter 200. Because processes in Steps S1, S2, S8, and S9 illustrated in FIG. 13 are the same as those in Steps S1, S2, S8, and S9 illustrated in FIG. 3, descriptions of these processes will be omitted.

After the execution of Steps S1 and S2, the observation signal generation unit 361e of the control unit 300e generates an electrical signal associated with one of four symbol values of PAM-4 modulation and outputs the generated electrical signal to the observation optical modulator 230 (Step S13). Where the four symbol values of the PAM-4 modulation are referred to as first to fourth symbol values, the observation signal generation unit 361e generates in Step S13 a voltage associated with the first symbol value, for example. Here, the observation signal generation unit 361e outputs the voltage associated with the first symbol value for a time longer than a response time of the light receiving elements of the observation optical modulator 230.

Next, the observation light absorption amount calculation unit 330e of the control unit 300e calculates a light absorption amount in the observation optical modulator 230 on the basis of information output from the observation optical modulator 230 (Step S14). Examples of the information output from the observation optical modulator 230 include information on a current or a voltage indicating the optical power of the continuous wave light input to the observation optical modulator 230 and information on a current or a voltage indicating optical power of an optical signal output from the observation optical modulator 230.

Next, the observation transmission loss calculation unit 331e of the control unit 300e calculates a transmission loss per unit length of the observation optical modulator 230 on the basis of: the light absorption amount calculated by the observation light absorption amount calculation unit 330e; and the length of the waveguide included in the observation optical modulator 230 (Step S15). The transmission loss per unit length of the observation optical modulator 230 is a transmission loss per unit length in the observation waveguide 231 of the observation optical modulator 230.

Next, the control unit 300e executes Steps S13 to S15 described above on each of the remaining three symbol values (Step S16). For example, where processes for the first symbol value are performed in first execution of Steps S13 to S15, the processes of Steps S13 to S15 are performed for each of the second symbol value, the third symbol value, and the fourth symbol value. Specifically, the control unit 300e repeatedly executes a process in which: the observation signal generation unit 361e generates an electrical signal associated with a symbol value; the observation light absorption amount calculation unit 330e calculates a light absorption amount in the observation optical modulator 230; and the observation transmission loss calculation unit 331e calculates a transmission loss per unit length of the observation optical modulator 230.

Here, where the optical power levels of the optical signal output by the observation optical modulator 230 when each of the four levels of voltage generated by the observation signal generation unit 361e is applied to the modulator 230 are denoted by level 3, level 2, level 1, and level 0 in descending order from the highest level similarly in the first embodiment, a transmission loss per unit length in the observation optical modulator 230 is obtained for each of level 0 to level 3 by the execution of Steps S13 to S16. Hereinafter, the transmission loss per unit length in the observation optical modulator 230 is simply referred to as "transmission loss per unit length".

After the transmission loss per unit length is obtained for each of level 0 to level 3, the bias voltage control unit 340e of the control unit 300e controls the DC bias voltage generated by the bias voltage generation unit 350, on the basis of each transmission loss per unit length.

Specifically, the bias voltage control unit 340e first obtains a difference between a transmission loss per unit length when the optical power is level 3 and a transmission loss per unit length when the optical power is level 2. Hereinafter, the difference is referred to as "transmission loss difference between levels 3 and 2". The bias voltage control unit 340e then obtains a difference between a transmission loss per unit length when the optical power is level 1 and a transmission loss per unit length when the optical power is level 0. Hereinafter, the difference is referred to as "transmission loss difference between levels 1 and 0". Next, the bias voltage control unit 340e compares a value obtained by adding the offset amount set in Step S1 to the transmission loss difference between the levels 3 and 2 with the transmission loss difference between the levels 1 and 0 (Step S17). In a case where "(transmission loss difference between levels 3 and 2+offset amount)<(transmission loss difference between levels 1 and 0)" holds true (Step S17: Yes), the bias voltage control unit 340e instructs the bias voltage generation unit 350 to increase the DC bias voltage, thereby causing the bias voltage generation unit 350 to execute Step S8. The case where "(transmission loss difference between levels 3 and 2+offset amount)<(transmission loss difference between levels 1 and 0)" holds true corresponds to a case where $\Delta T = T_{Nonlinear} - T_{Linear}$ illustrated in FIG. 2 is less than 0, that is, a case of $T_{Nonlinear} < T_{Linear}$.

In a case where "(transmission loss difference between levels 3 and 2+offset amount)<(transmission loss difference between levels 1 and 0)" does not hold true (Step S17: No), the bias voltage control unit 340e instructs the bias voltage generation unit 350 to decrease the DC bias voltage, thereby causing the bias voltage generation unit 350 to execute Step S9. The case where "(transmission loss difference between levels 3 and 2+offset amount)<(transmission loss difference between levels 1 and 0)" does not hold true corresponds to a case where $\Delta T = T_{Nonlinear} - T_{Linear}$ illustrated in FIG. 2 is equal to or greater than 0, that is, a case of $T_{Linear} \leq T_{Nonlinear}$.

The optical transmission apparatus 100e according to the present embodiment can be implemented by hardware having the configuration illustrated in FIG. 5, similarly to the optical transmission apparatus 100 according to the first embodiment.

As described above, in the optical transmission apparatus 100e according to the present embodiment, the control unit 300e calculates the transmission loss per unit length for each of the four levels of voltages to be applied to the optical transmitter 200, and adjusts the DC bias voltage to be applied to the optical transmitter 200, on the basis of the calculated four transmission losses per unit length. An effect similar to those of the optical transmission apparatuses according to the first to fifth embodiments can be obtained also in the optical transmission apparatus 100e according to the present embodiment.

Although the description of each embodiment has been made as to the optical transmission apparatus employing the PAM-4 modulation scheme which is four-level amplitude modulation, the optical transmission apparatus is merely an example. The configuration and control operation described in each embodiment is also applicable to an optical transmission apparatus employing a two-level amplitude modulation scheme and an optical transmission apparatus employing an amplitude modulation scheme providing signal levels that are even and larger in number than four, such that these optical transmission apparatuses can maintain the DC bias voltage at an appropriate value.

The configurations described in the embodiments above are merely examples of the content of the present invention and can be combined with other known technology and part thereof can be omitted or modified without departing from the gist of the present invention.

REFERENCE SIGNS LIST 100, 100a, 100e optical transmission apparatus; 200, 200b, 200c optical transmitter; 210, 210b, 210c continuous wave light generation unit; 211, 211c light source; 212 optical branching unit; 220, 220d optical modulator; 221 modulation waveguide; 222, 223, 232, 233 monitor PD; 225, 235 photocurrent monitor; 230, 230d observation optical modulator; 231 observation waveguide; 234 optical termination unit; 300, 300a, 300e control unit; 320 light absorption amount calculation unit; 321 transmission loss calculation unit; 330, 330e observation light absorption amount calculation unit; 331, 331e observation transmission loss calculation unit; 340 bias voltage control unit; 350 bias voltage generation unit; 360 modulation signal generation unit; 361, 361e observation signal generation unit.

The invention claimed is:

1. An optical transmission apparatus comprising:
an optical transmitter including a first optical modulator to attenuate optical power of input continuous wave light by an electro-absorption effect, and a second optical modulator to attenuate optical power of the input continuous wave light by the electro-absorption effect, wherein the first optical modulator performs pulse amplitude modulation on the continuous wave light and outputs the continuous wave light subjected to the pulse amplitude modulation in order to transmit data;
a bias voltage generator to generate a direct-current bias voltage and to output the direct-current bias voltage to the first optical modulator and the second optical modulator;
a first modulation signal generator to generate an electrical signal for the pulse amplitude modulation and to output the electrical signal to the first optical modulator, wherein the electrical signal is representative of data to be transmitted, and the second optical modulator does not receive any signal representative of data to be transmitted; and
a bias voltage controller to instruct the bias voltage generator to adjust the direct-current bias voltage, on a basis of an absorption amount of the optical power in the first optical modulator and an absorption amount of the optical power in the second optical modulator.

2. The optical transmission apparatus according to claim 1, wherein
the electrical signal for the pulse amplitude modulation has a voltage varying among four levels.

3. The optical transmission apparatus according to claim 1, wherein
the second optical modulator attenuates optical power of continuous wave light input from a light source and outputs the continuous wave light having the optical power attenuated, and
the first optical modulator performs pulse-amplitude modulation on the continuous wave light output from the second optical modulator.

4. The optical transmission apparatus according to claim 1, wherein
continuous wave light output from one of a pair of facing mirrors of a light source including a resonator structure formed of the pair of facing mirrors is input to the first optical modulator, and
continuous wave light output from the other of the pair of facing mirrors is input to the second optical modulator.

5. The optical transmission apparatus according to claim 1, further comprising:
a second modulation signal generator to generate an electrical signal for modulation whose voltage changes in a variation range smaller than a variation range of a voltage of an electrical signal for pulse amplitude modulation generated by the first modulation signal generator, and to output the electrical signal to the second optical modulator.

6. The optical transmission apparatus according to claim 1, comprising:
a first light absorption amount calculator to calculate a first light absorption amount that is a light absorption amount in the first optical modulator;
a first transmission loss calculator to calculate a transmission loss of light per unit length of a first waveguide of the first optical modulator on a basis of the first light absorption amount;
a second light absorption amount calculator to calculate a second light absorption amount that is a light absorption amount in the second optical modulator; and
a second transmission loss calculator to calculate a transmission loss of light per unit length of a second waveguide of the second optical modulator on a basis of the second light absorption amount, wherein
the bias voltage controller instructs the bias voltage generator to adjust the direct-current bias voltage, on a basis of a transmission loss of light per unit length of the first waveguide and a transmission loss of light per unit length of the second waveguide.

7. The optical transmission apparatus according to claim 6, wherein
the first light absorption amount calculator calculates the first light absorption amount on a basis of a voltage value indicating optical power of input light to the first waveguide and a voltage value indicating optical power of output light from the first waveguide, and
the second light absorption amount calculator calculates the second light absorption amount on a basis of a voltage value indicating optical power of input light to the second waveguide and a voltage value indicating optical power of output light from the second waveguide.

8. The optical transmission apparatus according to claim 6, wherein
the first light absorption amount calculator calculates the first light absorption amount on a basis of a value of a photocurrent generated when light absorption occurs in the first waveguide, and
the second light absorption amount calculator calculates the second light absorption amount on a basis of a value of a photocurrent generated when light absorption occurs in the second waveguide.

9. An optical transmission apparatus comprising:
an optical transmitter including first and second optical modulators each to attenuate optical power of input continuous wave light by an electro-absorption effect, wherein the first optical modulator performs pulse amplitude modulation on the continuous wave light and outputs the continuous wave light subjected to the pulse amplitude modulation in order to transmit data;
a bias voltage generator to generate a direct-current bias voltage and to output the direct-current bias voltage to the first optical modulator and the second optical modulator;
a first modulation signal generator to generate an electrical signal for the pulse amplitude modulation and to output the electrical signal to the first optical modulator, wherein the second optical modulator does not receive any signal representative of data to be transmitted;
a second modulation signal generator to sequentially generate electrical signals each having the same voltage as a corresponding one of voltages that can be provided by the electrical signal generated by the first modulation signal generator, and to output the electrical signals to the second optical modulator;
a light absorption amount calculator to sequentially calculate light absorption amounts in the second optical modulator when the electrical signals generated by the second modulation signal generator are individually input to the second optical modulator; and
a bias voltage controller to instruct the bias voltage generator to adjust the direct-current bias voltage, on a basis of the light absorption amounts calculated by the light absorption amount calculator.

10. An optical transmission method executed by an optical transmission apparatus comprising an optical transmitter including first and second optical modulators to attenuate optical power of input continuous wave light by an electro-absorption effect, and a controller to control the optical transmitter, the method comprising:
outputting a direct-current bias voltage to the first optical modulator and the second optical modulator;
outputting an electrical signal for pulse amplitude modulation to the first optical modulator, wherein the electrical signal is representative of data to be transmitted by the optical transmission apparatus, and the second optical modulator does not receive any signal representative of data to be transmitted;
generating, by the first optical modulator, a pulse amplitude modulated optical signal on a basis of the continuous wave light, the direct-current bias voltage, and the electrical signal for pulse amplitude modulation, wherein the optical signal is generated to transmit the data represented by the electrical signal; and
adjusting the direct-current bias voltage on a basis of a light absorption amount in the first optical modulator and a light absorption amount in the second optical modulator.

11. A control circuit of an optical transmission apparatus, the optical transmission apparatus comprising an optical transmitter including a first optical modulator to attenuate optical power of input continuous wave light by an electro-absorption effect, and a second optical modulator to attenuate optical power of input continuous wave light by the electro-absorption effect, wherein the first optical modulator performs pulse amplitude modulation on the continuous wave light and outputs the continuous wave light subjected to the pulse amplitude modulation, the control circuit comprising:
a bias voltage generator to generate a direct-current bias voltage and to output the direct-current bias voltage to the first optical modulator and the second optical modulator;
a first modulation signal generator to generate an electrical signal for the pulse amplitude modulation and to output the electrical signal to the first optical modulator, wherein the electrical signal is representative of data to be transmitted by the optical transmission apparatus, and the second optical modulator does not receive any signal representative of data to be transmitted; and
a bias voltage controller to instruct the bias voltage generator to adjust the direct-current bias voltage, on a basis of an absorption amount of the optical power in the first optical modulator and an absorption amount of the optical power in the second optical modulator.

12. A non-transitory storage medium of an optical transmission apparatus, the optical transmission apparatus comprising an optical transmitter including a first optical modulator to attenuate optical power of input continuous wave light by an electro-absorption effect, and a second optical modulator to attenuate optical power of input continuous wave light by the electro-absorption effect, wherein the first optical modulator performs pulse amplitude modulation on the continuous wave light and outputs the continuous wave light subjected to the pulse amplitude modulation in order to transmit data, the storage medium stores a program which when executed by a processor performs processes of:
generating a direct-current bias voltage and outputting the direct-current bias voltage to the first optical modulator and the second optical modulator;
generating an electrical signal for the pulse amplitude modulation and outputting the electrical signal to the first optical modulator, wherein the electrical signal is representative of data to be transmitted, and the second optical modulator does not receive any signal representative of data to be transmitted; and
providing an instruction to adjust the direct-current bias voltage, on a basis of an absorption amount of the optical power in the first optical modulator and an absorption amount of the optical power in the second optical modulator.

* * * * *